US010380745B2

(12) United States Patent
Buyukozturk et al.

(10) Patent No.: US 10,380,745 B2
(45) Date of Patent: Aug. 13, 2019

(54) METHODS AND DEVICES FOR MEASURING OBJECT MOTION USING CAMERA IMAGES

(71) Applicant: Massachusetts Institute of Technology, Cambridge, MA (US)

(72) Inventors: Oral Buyukozturk, Chestnut Hill, MA (US); William T. Freeman, Acton, MA (US); Frederic Durand, Somerville, MA (US); Myers Abraham Davis, Cambridge, MA (US); Neal Wadhwa, Mountain View, CA (US); Justin G. Chen, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 251 days.

(21) Appl. No.: 15/445,499

(22) Filed: Feb. 28, 2017

(65) Prior Publication Data

US 2018/0061063 A1  Mar. 1, 2018
US 2019/0035086 A2  Jan. 31, 2019

Related U.S. Application Data

(60) Provisional application No. 62/382,709, filed on Sep. 1, 2016.

(51) Int. Cl.
*G06T 7/20* (2017.01)
*G06T 7/277* (2017.01)
*G06T 7/262* (2017.01)

(52) U.S. Cl.
CPC .............. *G06T 7/20* (2013.01); *G06T 7/262* (2017.01); *G06T 7/277* (2017.01);
(Continued)

(58) Field of Classification Search
CPC .......... G06T 7/20; G06T 7/277; G06T 7/262; G06T 2/277; G06K 9/00
See application file for complete search history.

(56) References Cited

U.S. PATENT DOCUMENTS 6,049,619 A * 4/2000 Anandan ................ G06K 9/209
382/107
6,943,870 B2  9/2005 Toyooka et al.
(Continued)

FOREIGN PATENT DOCUMENTS

WO  WO 2016/145406 A1  9/2016

OTHER PUBLICATIONS

Avitabile, P., "Modal space: Back to basics," Experimental Techniques, 26(3):17-18 (2002).
(Continued)

*Primary Examiner* — Robert J Hance
(74) *Attorney, Agent, or Firm* — Hamilton, Brook, Smith & Reynolds, P.C.

(57) ABSTRACT

A method and corresponding apparatus for measuring object motion using camera images may include measuring a global optical flow field of a scene. The scene may include target and reference objects captured in an image sequence. Motion of a camera used to capture the image sequence may be determined relative to the scene by measuring an apparent, sub-pixel motion of the reference object with respect to an imaging plane of the camera. Motion of the target object corrected for the camera motion may be calculated based on the optical flow field of the scene and on the apparent, sub-pixel motion of the reference object with respect to the imaging plane of the camera. Embodiments may enable measuring vibration of structures and objects from long distance in relatively uncontrolled settings, with or without accelerometers, with high signal-to-noise ratios.

44 Claims, 12 Drawing Sheets
(4 of 12 Drawing Sheet(s) Filed in Color)

(52) U.S. Cl.
CPC .............. *G06T 2207/10016* (2013.01); *G06T 2207/20056* (2013.01); *G06T 2207/30241* (2013.01); *G06T 2207/30244* (2013.01)

(56) References Cited

U.S. PATENT DOCUMENTS

| | | | |
|---|---|---|---|
| 7,532,541 B2 | 5/2009 | Govindswamy | |
| 8,027,513 B2 | 9/2011 | Leichter et al. | |
| 8,251,909 B2 | 8/2012 | Arnold | |
| 9,172,913 B1 | 10/2015 | Johnston | |
| 9,324,005 B2 | 4/2016 | Wadhwa et al. | |
| 9,811,901 B2 | 11/2017 | Wu et al. | |
| 10,037,609 B2 | 7/2018 | Chen et al. | |
| 2003/0219146 A1* | 11/2003 | Jepson .................. | G06K 9/32 382/103 |
| 2006/0158523 A1* | 7/2006 | Estevez .............. | H04N 5/23248 348/208.4 |
| 2006/0177103 A1* | 8/2006 | Hildreth .............. | G06F 1/1626 382/107 |
| 2007/0002145 A1* | 1/2007 | Furukawa .......... | H04N 5/23248 348/207.99 |
| 2008/0123747 A1* | 5/2008 | Lee .................... | H04N 19/20 375/240.16 |
| 2008/0135762 A1 | 6/2008 | Villanucci et al. | |
| 2008/0151694 A1 | 6/2008 | Slater | |
| 2008/0273752 A1* | 11/2008 | Zhu .................... | B60W 40/02 382/103 |
| 2009/0095086 A1 | 4/2009 | Kessler et al. | |
| 2009/0121727 A1 | 5/2009 | Lynch et al. | |
| 2009/0322778 A1 | 12/2009 | Dumitras | |
| 2010/0079624 A1* | 4/2010 | Miyasako .......... | H04N 5/145 348/241 |
| 2010/0272184 A1* | 10/2010 | Fishbain ............ | G06T 3/4069 375/240.16 |
| 2011/0150284 A1* | 6/2011 | Son .................... | G06T 7/215 382/103 |
| 2011/0221664 A1* | 9/2011 | Chen .................. | G06F 3/017 345/156 |
| 2011/0222372 A1 | 9/2011 | O'Donovan et al. | |
| 2011/0254842 A1 | 10/2011 | Dmitrieva et al. | |
| 2012/0019654 A1* | 1/2012 | Venkatesan ........ | G01B 11/2509 348/142 |
| 2012/0020480 A1 | 1/2012 | Visser | |
| 2012/0027217 A1 | 2/2012 | Jun et al. | |
| 2013/0121546 A1 | 5/2013 | Guissin | |
| 2013/0147835 A1 | 6/2013 | Lee et al. | |
| 2013/0272095 A1 | 10/2013 | Brown et al. | |
| 2013/0301383 A1 | 11/2013 | Sapozhnikov et al. | |
| 2013/0329953 A1 | 12/2013 | Schreier | |
| 2014/0072190 A1 | 3/2014 | Wu et al. | |
| 2014/0072228 A1 | 3/2014 | Rubinstein et al. | |
| 2014/0072229 A1 | 3/2014 | Wadhwa et al. | |
| 2015/0016690 A1 | 1/2015 | Freeman et al. | |
| 2015/0030202 A1* | 1/2015 | Fleites .............. | G06K 9/00711 382/103 |
| 2015/0319540 A1 | 11/2015 | Rubinstein et al. | |
| 2016/0217587 A1 | 7/2016 | Hay | |
| 2016/0267664 A1 | 9/2016 | Davis et al. | |
| 2016/0316146 A1* | 10/2016 | Kajimura ........... | H04N 5/23287 |
| 2017/0109894 A1 | 4/2017 | Uphoff | |
| 2017/0221216 A1 | 8/2017 | Chen et al. | |

OTHER PUBLICATIONS

Ait-Aider, O., et al., "Kinematics from Lines in a Single Rolling Shutter Image," *Proceedings of CVPR '07*. 6 pages (2007).
Bathe, K.J., "Finite Element Procedures" Publisher Klaus-Jurgen Bathe, 2006.
Boll, S.F., "Suppression of Acoustic Noise in Speech Using Spectral Subtraction," *IEEE Trans. Acous. Speech Sig. Proc.*, ASSP-27(2): 113-120 (1979).
Brincker, R. , et al., "Why output-only modal testing is a desirable tool for a wide range of practical applications," *Proc. of the International Modal Analysis Conference (IMAC) XXI*, Paper vol. 265. (2003).
Caetano, E., et al., "A Vision System for Vibration Monitoring of Civil Engineering Structures," *Experimental Techniques*, vol. 35; No. 4; 74-82 (2011).
Chen, J.G., et al., "Near Real-Time Video Camera Identification of Operational Mode Shapes and Frequencies," 1-8 (2015).
Chen, J. G., et al., "Long Distance Video Camera Measurements of Structures," *10th International Workshop on Structural Health Monitoring (IWSHM 2015)*, Stanford, California, Sep. 1-3, 2015 (9 pages).
Chen, J.G., et al., "Structural Modal identification through high speed camera video: Motion magnification." *Topics in Modal Analysis I, J. De Clerck, Ed., Conference Proceedings of the Society for Experimental Mechanics Series.* Springer International Publishing, vol. 7, pp. 191-197 (2014).
Chen, J.G., et al., "Modal Identification of Simple Structures with High-Speed Video Using Motion Magnification," *Journal of Sound and Vibration*, 345:58-71 (2015).
Chen, J. G., et al., "Developments with Motion Magnification for Structural Modal Identification," *Dynamics of Civil Structures*, vol. 2; 49-57 (2015).
Chuang, Y.-Y., et al., "Animating pictures with stochastic motion textures," *ACM Trans. on Graphics—Proceedings of ACM Siggraph*, 24(3):853-860 (Jul. 2005).
Davis, A., et al., "Visual Vibrometry: Estimating Material Properties from Small Motion in Video," *The IEEE Conference on Computer Vision and Pattern Recognition (CVPR)*, 2015.
Davis, A., et al., "The Visual Microphone: Passive Recovery of Sound From Video," *MIT CSAIL* pp. 1-10 (2014); *ACM Transactions on Graphics (Proc. SIGGRAPH)* 33, 4, 79:1-79:10 (2014).
Davis, A., et al., "Image-Space Modal Bases for Plausible Manipulation of Objects in Video," *ACM Transactions on Graphics*, vol. 34, No. 6, Article 239, (Nov. 2015).
De Cheveigne, A., "YIN, A Fundamental Frequency Estimator for Speech and Musica)," *J. Acoust. Soc. Am.*, 111(4): 1917-1930 (2002).
De Roeck, G., et al., "Benchmark study on system identification through ambient vibration measurements," *Proceedings of IMAC-XVIII, the 18th International Modal Analysis Conference*, San Antonio, Texas, pp. 1106-1112 (2000).
Doretto, G., et al., "Dynamic textures," *International Journal of Computer Vision*, 51(2):91-109 (2003).
Fleet, D.J. and Jepson, A.D., "Computation of Component Image Velocity From Local Phase Information," *International Journal of Computer Vision* 5(1):77-104 (1990).
Freeman, W.T. and Adelson, E.H., "The Design and Use of Steerable Filters," *IEEE Transactions on Pattern Analysis and Machine Intelligence* 13(9):891-906 (1991).
Garofolo, J.S., et al., "DARPA TIMIT Acoustic-Phonetic Continuous Speech Corpus CD-ROM," NIST Speech Disc 1-1.1 (1993).
Gautama, T. and Val Hulle, M.M., "A Phase-Based Approach to the Estimation of the Optical Flow Field Using Spatial Filtering," *IEEE Transactions on Neural Networks* 13(5):1127-1136 (2002).
Geyer, C., et al. "Geometric Models of Rolling-Shutter Cameras," EECS Department, University of California, Berkeley, 1-8 (2005).
Grundmann, M., et al., "Calibration-Free Rolling Shutter Removal," http://www.cc.gatech.edu/cpl/projects/rollingshutter, 1-8 (2012).
Hansen, J.H.L. and Pellom, B.L., "An Effective Quality Evaluation Protocol for Speech Enhancement Algorithms," Robust Speech Processing Laboratory, http://www.ee.duke.edu/Research/Speech (1998).
Helfrick, M.N., et al., "3D Digital Image Correlation Methods for Full-field Vibration Measurement,"*Mechanical Systems and Signal Processing*, 25:917-927 (2011).
Hermans, L. and Van Der Auweraer, H., "Modal Testing and Analysis of Structures Under Operational Conditions: Industrial Applications," *Mechanical and Systems and Signal Processing* 13(2):193-216 (1999).
Horn, B.K.P. and Schunck, B.G., "Determining Optical Flow," *Artificial Intelligence*, 17(1-3), 185-203 (1981).

(56) References Cited

OTHER PUBLICATIONS

Huang, J., et al., "Interactive shape interpolation through controllable dynamic deformation," *Visualization and Computer Graphics, IEEE Transactions* on 17(7):983-992 (2011).

James, D.L., and Pai, D.K., "Dyrt: Dynamic Response Textures for Real Time Deformation simulation with Graphics Hardware," *ACM Transactions on Graphics (TOG)*, 21(3):582-585 (2002).

James, D.L, and Pai, D.K., "Multiresolution green's function methods for interactive simulation of large-scale elastostagic objects," *ACM Transactions on Graphics (TOG)* 22(I):47-82 (2003).

Janssen, A.J.E.M., et al., "Adaptive Interpolation of Discrete-Time Signals That Can Be Modeled as Autoregressive Processes," *IEEE Trans. Acous. Speech, Sig. Proc.*, ASSP-34(2): 317-330 (1986).

Jansson, E., et al. "Resonances of a Violin Body Studied," *Physica Scripta*, 2: 243-256 (1970).

Joshi, N., et al., "Image Deblurring using Inertial Measurement Sensors," *ACM Transactions on Graphics*, vol. 29; No. 4; 9 pages (2010).

Kim, S.-W. and Kim, N.-S., "Multi-Point Displacement Response Measurement of Civil Infrastructures Using Digital Image Processing," *Procedia Engineering* 14:195-203 (2011).

Langlois, T.R., et al., "Eigenmode compression for modal sound models," *ACM Transactions on Graphics (Proceedings of SIGGRAPH 2014)*, 33(4) (Aug. 2014).

Li, S., et al., "Space-time editing of elastic motion through material optimization and reduction," ACM Transactions on Graphics, 33(4), (2014).

Liu, C., et al., "Motion Magnification," *Computer Science and Artificial Intelligence Lab (CSAIL)*, Massachusetts Institute of Technology (2005).

Loizou, P.C., "Speech Enhancement Based on Perceptually Motivated Bayesian Estimators of the Magnitude Spectrum," *IEEE Trans. Speech Aud. Proc.*, 13(5): 857-869 (2005).

Long, J. and Buyukorturk, O., "Automated Structural Damage Detection Using One-Class Machine Learning," *Dynamics of Civil Structures*, vol. 4; edited by Catbas, F. N., Conference Proceedings of the Society for Experimental Mechanics Series; 117-128; Springer International Publishing (2014).

Lucas, B. D. and Kanade, T., "An Iterative Image Registration Technique With an Application to Stereo Vision," *Proceedings of the 7th International Joint Conference on Artificial Intelligence*, pp. 674-679 (1981).

Mohammadi Ghazi, R. and Buyukorturk, O., "Damage detection with small data set using energy-based nonlinear features," *Structural Control and Health Monitoring*, vol. 23; 333-348 (2016).

Morlier, J., et al., "New Image Processing Tools for Structural Dynamic Monitoring." (2007).

Nakamura, J., "Image Sensors and Signal Processing for Digital Still Cameras," (2006).

Oxford English Dictionary entry for "optical," retrieved on Nov. 21, 2016 from http://www.oed.com/view/Entry/132057?redirectedFrom=optical#eid.

Pai, D.K., et al., "Scanning Physical Interaction Behavior of 3d Objects," *Proceedings of the 28th Annual Conference on Computer Graphics and Interactive Techniques*, ACM, New York, NY, USA, SIGGRAPH '01, pp. 87-96 (2001).

Park, J.-W., et al., "Vision-Based Displacement Measurement Method for High-Rise Building Structures Using Partitioning Approach," *NDT&E International* 43:642-647 (2010).

Park, S. H. and Levoy, M., "Gyro-Based Multi-Image Deconvolution for Removing Handshake Blur," *Computer Vision and Pattern Recognition (CVPR)*, Columbus, Ohio; 8 pages (2014).

Patsias, S. and Staszewski, W. J., "Damage Detection using Optical Measurements and Wavelets," *Structural Health Monitoring* 1(1):5-22 (Jul. 2002).

Pentland, A. and Sclaroff, S., "Closed-form Solutions for Physically Based Shape Modeling and Recognition," *IEEE Transactions on Pattern Analysis and Machine Intelligence*, 13(7):715-729 (Jul. 1991).

Pentland, A., and Williams. J., "Good vibrations: Modal Dynamics for Graphics and Animation," *SIGGRAPH '89 Proceedings of the 16th Annual Conference on Computer Graphics and Interactive Techniques*, ACM, vol. 23, pp. 215-222 (1989).

Poh, M.Z., et al., "Non-Contact, Automated Cardiac Pulse Measurements Using Video Imaging and Blind Source Separation," *Optics Express*, 18(10): 10762-10774 (2010).

Portilla, J. and Simoncelli, E. P., "A Parametric Texture Model Based on Joint Statistics of Complex Wavelet Coefficients," *Int'l. J. Comp. Vis.*, 40(1): 49-71 (2000).

Poudel, U., et al., "Structural damage detection using digital video imaging technique and wavelet transformation," *Journal of Sound and Vibration*, 286(4):869-895 (2005).

Powell, R.L. and Stetson, K.A., "Interferometric Vibration Analysis by Wavefront Reconstruction," *J. Opt. Soc. Amer.*, 55(12): 1593-1598 (1965).

Rothberg, S.J., et al., "Laser Vibrometry: Pseudo-Vibrations," *J. Sound Vib.*, 135(3): 516-522 (1989).

Rubinstein, M., "Analysis and Visualization of Temporal Variations in Video," (2014).

Schödl, A., et al., "Video Textures," *Proceedings of the 27th Annual Conference on Computer Graphics and Interactive Techniques*, ACM Press/Addison-Wesley Publishing Co., New York, NY, USA, SIGGRAPH '00, pp. 489-498 (2000).

Shabana, A.A. "Theory of Vibration," vol. 2., Springer (1991).

Simoncelli, E.P., et al., "Shiftable multi-scale transforms," *IEEE Trans. Info. Theory*, 2(38):587-607 (1992).

Smyth, A. and Meiliang, W., "Multi-rate Kalman filtering for the data fusion of displacement and acceleration response measurements in dynamic system monitoring," *Mechanical Systems and Signal Processing*, vol. 21; 706-723 (2007).

Sohn, H., et al., "Structural health monitoring using statistical pattern recognition techniques," *Journal of Dynamic Systems, Measurement, and Control*, vol. 123; No. 4; 706-711 (2001).

Stam, J., "Stochastic Dynamics: Simulating the effects of turbulence on flexible structures", *Computer Graphics Forum*, 16(3):C159-C164 (1997).

Stanbridge, A.B. and Ewins, D.J., "Modal Testing Using a Scanning Laser Doppler Vibrometer," *Mech. Sys. Sig. Proc.*, 13(2): 255-270 (1999).

Sun, M., et al., "Video input driven animation (vida)," *Proceedings of the Ninth IEEE International Conference on Computer Vision—vol. 2*, IEEE Computer Society, Washington, DC, USA, 96, (2003).

Szummer, M., and Picard, R.W., "Temporal texture modeling," *IEEE Intl. Conf. Image Processing*, 3:823-836 (1996).

Taal, C.H., et al.,"An Algorithm for Intelligibility Prediction of Time-Frequency Weighted Noisy Speech," *IEEE Trans. Aud. Speech, Lang. Proc.*, 19(7): 2125-2136 (2011).

Tao, H., and Huang, T.S., "Connected vibrations: A modal analysis approach for non-rigid motion tracking," *CVPR, IEEE Computer Society*, pp. 735-740 (1998).

Van Den Doel, K., and Pai, D.K., "Synthesis of shape dependent sounds with physical modeling," *Proceedings of the International Conference on Auditory Display (ICAD)* (1996).

Wadhwa, N., et al., "Phase-Based Video Motion Processing," *ACM Trans Graph. (Proceedings SIGGRAPH 2013)* 32(4), (2013).

Wadhwa, N., et al., "Riesz Pyramids for Fast Phase-Based Video Magnification," *Computational Photography (ICCP), IEE International Conference on IEEE* (2014).

Wu, H.-Y., et al., "Eulerian video magnification for revealing subtle changes in the world," *ACM Trans. Graph. (Proc. SIGGRAPH)* 31 (Aug. 2012).

Zalevsky, Z., et al., "Simultaneous Remote Extraction of Multiple Speech Sources and Heart Beats from Secondary Speckles Pattern," *Optic Exp.*, 17(24):21566-21580 (2009).

Zheng, C., and James, D.L., "Toward high-quality modal contact sound," *ACM Transactions on Graphics (TOG).*, vol. 30, ACM, 38 (2011).

Alam, Shafaf, Surya PN Singh, and Udantha Abeyratne. "Considerations of handheld respiratory rate estimation via a stabilized Video Magnification approach." Engineering in Medicine and Biology Society (EMBC), 2017 39th Annual International Conference of the IEEE. IEEE, 2017.

(56) References Cited

OTHER PUBLICATIONS

Jobard, Bruno, Gordon Erlebacher, and M. Yousuff Hussaini. "Lagrangian-Eulerian advection of noise and dye textures for unsteady flow visualization." IEEE Transactions on Visualization and Computer Graphics 8.3 (2002): 211-222.
Nunez, Alfonso, et al. "A space-time model for reproducing rain field dynamics." (2007): 175-175.
Shi, Gong, and Gang Luo. "A Streaming Motion Magnification Core for Smart Image Sensors," IEEE Transactions on Circuits and Systems II: Express Briefs (2017).
Wang, Wenjin, Sander Stuijk, and Gerard De Haan. "Exploiting spatial redundancy of image sensor for motion robust rPPG." IEEE Transactions on Biomedical Engineering 62.2 (2015): 415-425.
Vendroux, G and Knauss, W. G., "Submicron Deformation Field Measurements: Part 2. Improved Digital Image Correlation," Experimental Mechanics; vol. 38; No. 2; 86-92 (1998).
Notice of Allowance and Fee(s) Due for U.S. Appl. No. 15/068,357, dated Feb. 7, 2019.

\* cited by examiner

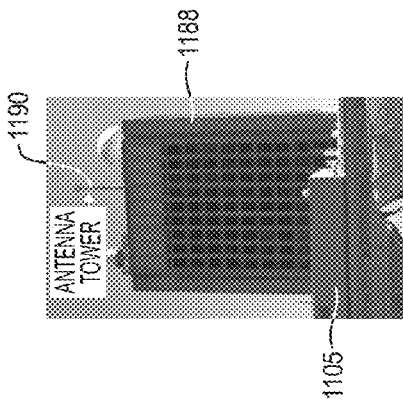
FIG. 11A
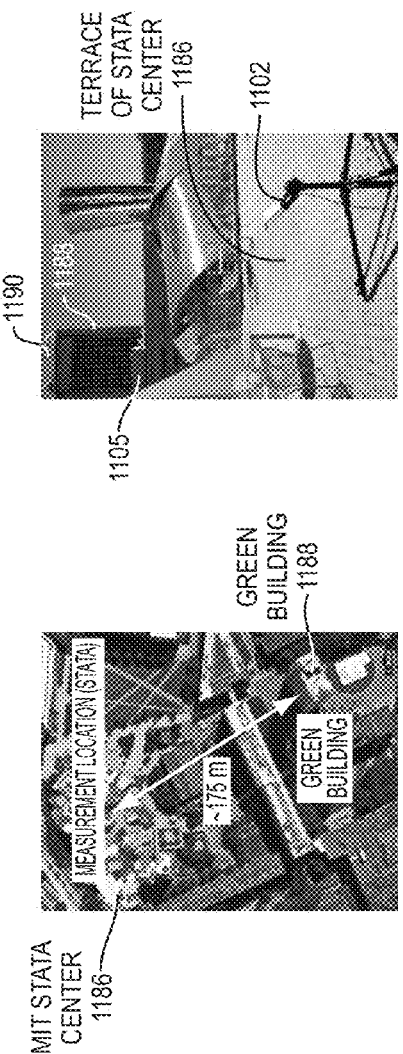
FIG. 11B
FIG. 11C
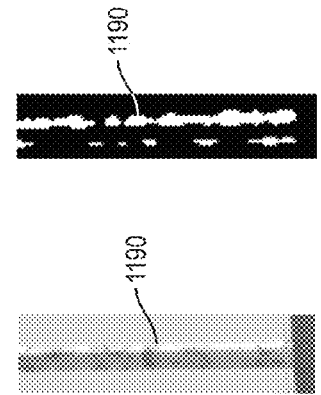
FIG. 12A
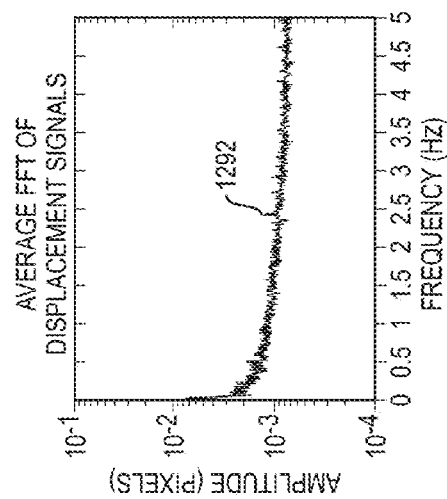
FIG. 12B
FIG. 13A
FIG. 13B

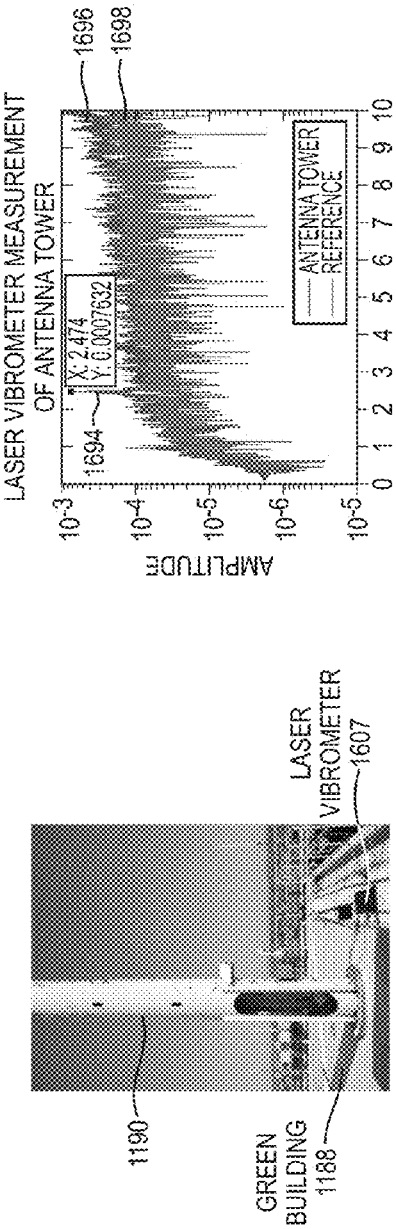
FIG. 16A
FIG. 16B
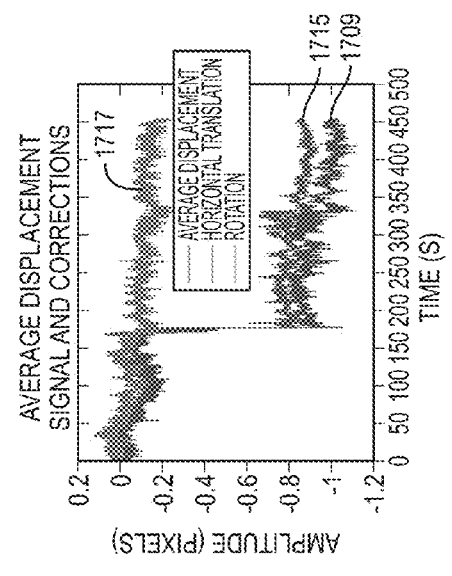
FIG. 17A
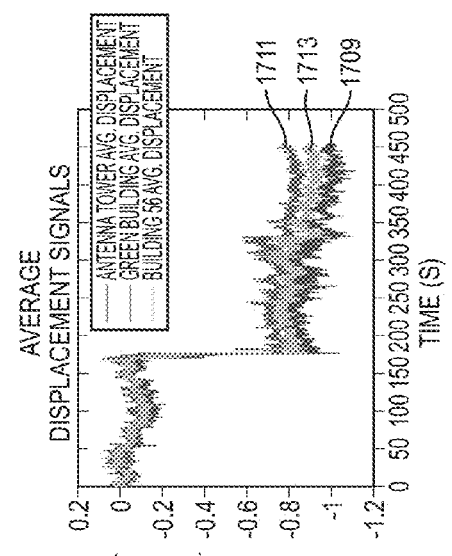
FIG. 17B
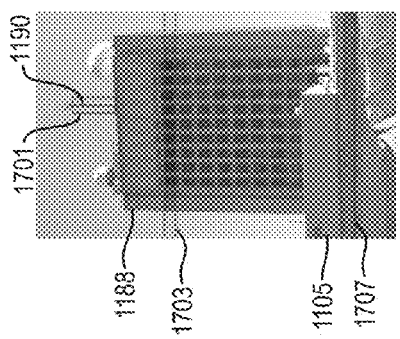
FIG. 17C

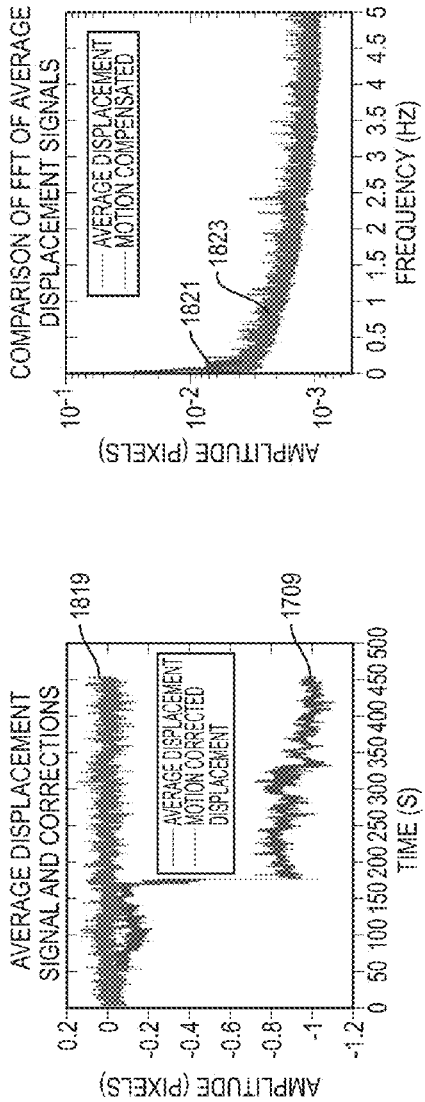

METHODS AND DEVICES FOR MEASURING OBJECT MOTION USING CAMERA IMAGES

RELATED APPLICATIONS

This application claims the benefit of U.S. Provisional Application No. 62/382,709, filed on Sep. 1, 2016. The entire teachings of the above application are incorporated herein by reference.

BACKGROUND

It is often desirable to measure structural health of buildings and structures by monitoring their motions. Monitoring motion of a structure has been accomplished traditionally by using motion sensors attached to the structure in various locations. More recently, attempts have been made to measure motion of a structure using a video acquired by a camera viewing the structure.

SUMMARY

Traditional methods of monitoring structural motion suffer from several inadequacies. For example, using motion sensors attached to the structure can require undesirable and laborious setup. Such use of sensors can also involve wiring and maintaining communication between the sensors and a computer, for example, which is often inconvenient. Furthermore, more recent attempts to monitor motion of structures using video images have been significantly impacted by noise from motion of the camera itself with respect to the scene. As such, accuracy of remote camera-based measurements has not progressed satisfactorily, and noise in measurements remains a significant issue because motion of monitored objects can be extremely small.

Embodiment methods and devices described herein can be used to overcome these difficulties by removing noise from video-based structural measurements, in the form of the apparent motions of the target or reference object due to the real motion of the camera, to produce corrected motions of the target object with substantially minimized noise. Embodiments can enable measurement of vibration of structures and objects using video cameras from long distances in relatively uncontrolled settings, with or without accelerometers, with high signal-to-noise ratios. Motion sensors are not required to be attached to the structure to be monitored, nor are motion sensors required to be attached to the video camera. Embodiments can discern motions more than one order of magnitude smaller than previously reported.

In one embodiment, a method and corresponding device for measuring motion of an object using camera images includes measuring a global optical flow field of a scene including a target object and a reference object. The target and reference objects are captured as representations in an image sequence of the scene. The method also includes determining motion, relative to the scene, of a camera used to capture the image sequence by measuring an apparent, sub-pixel motion of the reference object with respect to an imaging plane of the camera. The method still further includes calculating a corrected motion of the target object, corrected for the camera motion, based on the optical flow field of the scene and on the apparent, sub-pixel motion of the reference object with respect to the imaging plane of the camera.

Determining the motion of the camera can include measuring the apparent, sub-pixel motion of the reference object within a frequency range on the same order of magnitude as a frequency range of motion of the target object. Determining the motion of the camera can also include using measurements from an external sensor to calculate the motion. The external sensor can include at least one of an accelerometer, gyroscope, magnetometer, inertial measurement unit (IMU), global positioning system (GPS) unit, or velocity meter. Further, using measurements from the external sensor can include using the external sensor attached to one of the target object, reference object, and camera. The method can also include using a Kalman filter, Bayesian Network, or other sensor fusion technique to obtain a best estimate external sensor measurement used to determine motion of the camera.

Determining motion of the camera can include measuring the apparent, sub-pixel motion of the reference object in one or two linear axes contained within the imaging plane of the camera. Determining the motion of the camera can further include measuring apparent rotation of the reference object within the imaging plane of the camera. Measuring the global optical flow field of the scene can include using at least a portion of the scene with the reference object being at least one of a foreground object or a background object.

In some applications, the target object can include of a seismic structure, a hydraulic fracturing environment structure, a water or oil or gas reservoir, or a volcano. The method can further include using the corrected motion of the target object for seismic oil exploration, monitoring a condition of the reservoir, or the monitoring geological features of the volcano. In other applications, the target object can include a bridge, oil rig, crane, or machine.

Measuring the optical flow field of the scene can include using motion magnification. Measuring the optical flow field of the scene can include combining representations of local motions of a surface in the scene to produce a global motion signal. Measuring the global optical flow field of the scene can also include extracting pixel-wise Eulerian motion signals of an object in the scene from an undercomplete representation of frames within the image sequence and downselecting pixel-wise Eulerian motion signals to produce a representative set of Eulerian motion signals of the object. Downselecting the signals can include choosing signals on a basis of local contrast in the frames within the image sequence. Measuring the optical flow field of the scene can also include observing target and reference objects situated at least 30 meters (m) from the camera used to capture the image sequence.

The measuring, determining, and calculating can occur at a network server, sometimes referred to herein as a "device," and operate on the image sequence received via a network path. The method can further include uploading the image sequence to a remote server or downloading a representation of the corrected motion of the target object from the remote server. The camera can be part of a mobile device, and the measuring, determining, and calculating can occur in the mobile device. The mobile device can include an external sensor including at least one of an accelerometer, gyroscope, magnetometer, IMU, global positioning system (GPS) unit, or velocity meter.

Measuring the apparent, sub-pixel motion of the reference object can include measuring sub-pixel motion in a range of 0.03 to 0.3 pixels or in a range of 0.003 to 0.03 pixels. Calculating the corrected motion of the target object can include calculating a corrected motion in a range of 0.03 to 0.3 pixels or in a range of 0.003 to 0.03 pixels.

In another embodiment, a device and corresponding method for measuring the motion of an object using camera images includes memory configured to store an image sequence of a scene including a target object and a reference object captured as representations in the image sequence. The device further includes a processor configured to (i) measure a global optical flow field of the scene from the image sequence of the scene; (ii) determine motion, relative to the scene, of a camera used to capture the image sequence by measuring an apparent, sub-pixel motion of the reference object with respect to an imaging plane of the camera; and (iii) calculate a corrected motion of the target object, corrected for the camera motion, based on the optical flow field of the scene and on the apparent, sub-pixel motion of the reference object with respect to the imaging plane of the camera.

The processor can be further configured to determine the motion of the camera by (i) measuring the apparent, sub-pixel motion of the reference object within a frequency range on the same order of magnitude as a frequency range of motion of the target object; or (ii) using measurements from an external sensor to calculate the motion, the external sensor including at least one of an accelerometer, gyroscope, magnetometer, inertial measurement unit (IMU), global positioning system (GPS) unit, or velocity meter; or (iii) both (i) and (ii).

The external sensor may be attached to one of the target object, reference object, or camera. The processor may be further configured to implement Kalman filtering or another sensor fusion technique to obtain a best estimate external sensor measurement used to determine the motion of the camera. The processor can be further configured to determine the motion of the camera by (i) measuring the apparent, sub-pixel motion of the reference object in one or two linear axes contained within the imaging plane of the camera; (ii) measuring apparent motion of the reference object within the imaging plane of the camera; or (iii) both (i) and (ii). The processor may be further configured to measure the global optical flow field of the scene by using at least a portion of the scene with the reference object being at least one of a foreground object or a background object.

The target object can include at least one of a seismic structure, a hydraulic fracturing environment structure, a water or oil or gas reservoir, or a volcano, and the processor can be further configured to use the corrected motion of the target object for seismic oil exploration, monitoring a condition of the reservoir, or monitoring geological features of the volcano. The target object can include at least one of a bridge, oil rig, crane, or machine.

The processor may be further configured to measure the global optical flow field of the scene by (i) using motion magnification; (ii) extracting pixel-wise Eulerian motion signals of an object in the scene from an undercomplete representation of frames within the image sequence and to downselect pixel-wise Eulerian motion signals to produce a representative set of Eulerian motion signals of the object; or (iii) both (i) and (ii).

The processor can be further configured to downselect the signals by choosing signals on a basis of local contrast in the frames within the image sequence. The image sequence of the scene may include the target and reference objects situated at least 30 meters (m) from the camera used to capture the image sequence. The processor may be part of a network server, and the processor can be configured to operate on, or the memory can be configured to receive, the image sequence via a network path. The memory may be further configured to receive the image sequence from a remote server, or the device may further include a communications interface configured to send a representation of the corrected motion of the target object to a remote server.

The camera, memory, and processor may form part of a mobile device. The mobile device may include an external sensor including at least one of an accelerometer, gyroscope, magnetometer, IMU, global positioning system (GPS) unit, or velocity meter.

The sub-pixel motion of the reference object, or the corrected motion of the target object, or both, may be in a range of 0.03 to 0.3 pixels or in a range of 0.003 to 0.03 pixels.

In yet another embodiment, a method of measuring motion of an object using camera images includes measuring a global optical flow field of a scene including a target object captured as representations in an image sequence of the scene. The method further includes determining motion, relative to the scene, of a camera used to capture the image sequence. Determining motion is performed by obtaining a sub-pixel motion measurement from an external sensor. The motion measurement from the external sensor is sub-pixel with respect to pixel array of the camera. The method also includes calculating a corrected motion of the target object, corrected for the camera motion, based on the optical flow field of the scene and the sub-pixel motion measurement from the external sensor.

Determining motion of the camera can further include obtaining the sub-pixel motion measurement from the external sensor within a frequency range on the same order of magnitude as a frequency range of motion of the target object. Determining motion of the camera can further include measuring an apparent, sub-pixel motion of the reference object with respect to an imaging plane of the camera. Determining motion of the camera can include obtaining the sub-pixel motion measurement from the external sensor in a range of 0.03 to 0.3 pixels or in a range of 0.003 to 0.03 pixels.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 11A-18C illustrate various aspects of an example measurement of a corrected motion of the target object including optional verification measurements and calculations providing proof of concept. More particular brief descriptions follow hereinafter.

FIGS. 11A-11C are illustrations and photographs showing the overall layout of the proof-of-concept test, including an aerial layout in FIG. 11A, as well as a photograph of camera equipment and location and target and reference structures in FIG. 11B. FIG. 11C is a video image of target and reference structures from a 454 second video acquired for the proof-of-concept testing purposes.

FIG. 12A is an image of the target and reference structures, similar to the image in FIG. 11C, but having a pixel mask overlaid thereon.

FIG. 12B shows an average Fast Fourier Transform (FFT) frequency spectrum for the relevant pixels that were not masked in FIG. 12A, for a 150 second segment of the 454 second video acquired.

FIG. 13A is an image from a cropped portion of the video, containing only an antenna tower target, which was used to analyze the motion of the antenna tower more effectively.

FIG. 13B shows high-contrast pixels from the image in FIG. 13A in white, with the remaining pixels masked and shown as darkened.

FIG. 16A is a photograph showing a laser vibrometer measurement setup used to verify frequency response of the antenna tower.

FIG. 16B is a graph showing laser vibrometer measurements obtained using the measurement setup illustrated in FIG. 16A.

FIG. 17A is a photograph of the Green Building (reference object) and antenna tower (target object), also showing regions of interest used to calculate displacement signals and perform motion compensation.

FIG. 17B shows averaged displacement signals for the respective regions of interest illustrated in FIG. 17A.

FIG. 17C is a graph showing various calculations performed for the purpose of correcting the motion signal of the antenna tower target.

FIG. 18A is a graph showing the motion corrected displacement signal for the antenna tower target, resulting from subtraction of both horizontal translation and rotational displacement calculated using the reference object.

FIG. 18B is a graph showing the effects, in the Fourier domain, of correcting the antenna tower target signal for camera motion.

FIG. 18C is a graph showing, in greater detail, the difference in frequency spectrum between the spectra in FIG. 18B.

DETAILED DESCRIPTION

Figure 1:
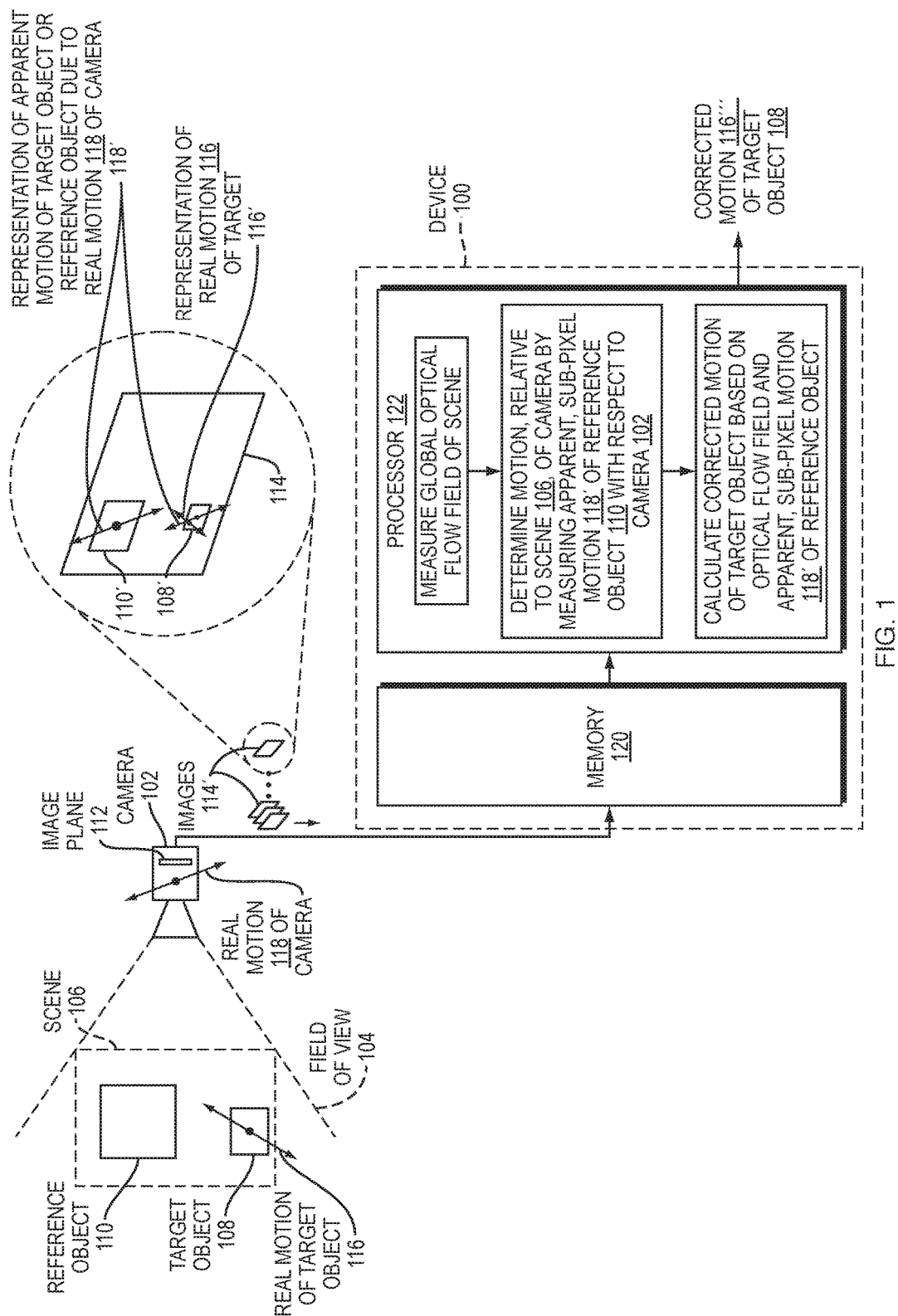
FIG. 1 is a schematic diagram illustrating an embodiment device for measuring motion of a target object using camera images that include the target object and a reference object.

A description of example embodiments of the invention follows.

General Description of Embodiments

According to embodiment methods and devices described herein, vibrations of structures can be measured, even from a long distance in an uncontrolled outdoor setting, using a video camera. Cameras are quick to set up and can be used to measure motion of a large structure. This is in contrast to the use of traditional wired accelerometers, which are labor intensive to use.

Using embodiments described herein, the noise floor can be a fraction of a pixel and also over an order of magnitude better than existing camera-based methods for measuring structures from a long distance. Embodiments described herein can be used to measure the displacements of a structure to detect structural damage, for example. Furthermore, embodiments can also be adapted to provide long-term monitoring of the structural integrity and health of a wide variety of structures and environments, as further described hereinafter.

In some embodiments, a video camera can be used to record a long video of a target object (e.g., target structure) of interest under typical operational or ambient vibrations. A region of interest in the video can be defined around the target structure being measured. In some embodiments, one reference object that is relatively more stationary than the target structure, at least within a frequency range of interest for the target structure, can be used to measure camera translation with respect to the scene. Furthermore, in some embodiments, particularly where it is desirable to correct measured motion of the target structure for rotation of the camera, two or more stationary reference objects may be used. Thus, at least two stationary objects outside the region of interest for the target structure can also be in the video frame (sequence of images) as references for motion compensation.

In-plane displacements can be extracted from the video for both the target structure of interest and other regions of the video. The displacement signals from the structure of interest can be compensated for camera motion. The compensated displacement signals can then be initially analyzed in the time domain or frequency domain by averaging the signals. Then, with the effects of motion of the camera with respect to the scene having been removed from the signals, any other detailed analysis for the condition assessment of the structure can be carried out using the corrected, measured displacement signals or frequency signals of the structure of interest.

In accordance with embodiment methods and devices, video of a vibrating target structure can be acquired, and this can be followed by computing the displacement signal everywhere on the target structure in the video sequence of images. In order to compute the displacement signals, a technique related to phase-based motion magnification can be used. Phase-based motion magnification is described in the paper Wadhwa, N., Rubinstein, M., Durand, F. and Freeman, W. T., Phase-Based Video Motion Processing, ACM Trans. Graph. (Proceedings SIGGRAPH 2013), Vol. 32, No. 4, 2013, the entirety of which is incorporated by reference herein.

Displacement signals may be well-defined only at edges in the regions of interest in the video. Further, displacement signals may be well-defined only in a direction perpendicular to the edges. This is because observed motion of textureless, homogeneous regions can be locally ambiguous. Determining the motion at places (regions of interest of the measured sequence of images) where the motion signals are ambiguous is an open problem in computer vision known as dense optical flow. Existing dense optical flow techniques, however, are often inaccurate.

In order to overcome some issues with existing dense optical flow techniques, embodiments described herein can utilize only motion signals corresponding to edges of a structure. For purposes of modal detection, it can be sufficient to determine the motion at the edges of the structure, while masking other pixels in video images that do not correspond to edges. In the case of a cantilever beam, for example, the entire beam is an edge, and the displacement signal can be determined everywhere on it. A technique based on local phase and local amplitude in oriented complex spatial bandpass filters can be used to compute the displacement signal and edge strength simultaneously. This type of computation is described in the papers Fleet, D. J. and Jepson, A. D., Computation of component image velocity from local phase information, Int. J. Comput. Vision, Vol. 5, No. 1, pp. 77-104, September 1990; and Gautama, T. and Van Hulle, M., A phase-based approach to the estimation of the optical flow field using spatial filtering, Neural Networks, IEEE Transactions on, Vol. 13, No. 5, pp. 1127-1136, September 2002; each paper of which is incorporated by reference herein in its entirety.

The local phase and local amplitude are locally analogous quantities to the phase and amplitude of Fourier series coefficients. The phase controls the location of basis function, while the amplitude controls its strength. In the case of the Fourier transform, the phase corresponds to global motion. Local phase gives a way to compute local motion. For a video, with image brightness specified by I(x, y, t) at spatial location (x, y) and time t, the local phase and local amplitude in orientation θ at a frame at time $t_0$ can be computed by spatially bandpassing the frame with a complex filter $G_2^\theta + iH_2^\theta$ to get $$A_0(x,y,t_0)e^{i\phi_\theta(x,y,t_0)} = (G_2^\theta + iH_2^\theta) \otimes I(x,y,t_0) \quad (1)$$

where $A_0(x,y,t_0)$ is the local amplitude and $\phi_\theta(x,y,t_0)$ is the local phase. The filters $G_2^\theta$ and $Hd_2^\theta$ are specified in the paper Freeman, W. T. and Adelson, E. H., The design and use of steerable filters, IEEE Transactions on Pattern analysis and machine intelligence, Vol. 13, No. 9, pp. 891-906, 1991, the entirety of which is incorporated herein by reference. In other embodiments, other filter pairs are used such as the complex steerable pyramid or a different wavelet filter, for example.

Spatial downsampling can be used on the video sequence to increase signal-to-noise ratio (SNR) and change the scale on which the filters are operating, where the video sequence may be spatially downsampled in such embodiments. In general, the maximum motion amplitude that can be handled may be limited. For example, this limit can be on the order of two pixels. In order to handle larger motions, the video can be spatially downsampled. For example, spatial downsampling can be performed in factors of two, either once or multiple times in each dimension of the image sequence (i.e., imaging plane of the camera) prior to application of the filters.

As a further example of downsampling, a 100×100 pixel video frame, for example, can become, effectively, a 50×50 pixel frame, such that a motion of two pixels in each dimension of the original unprocessed video becomes a motion of, effectively, one pixel in that dimension. A sequence of video images can be further downsampled by factors of 2, for example. However, the effective noise floor is increased, as each pixel then spans twice the physical distance. Downsampling can be accomplished in a number of ways, from averaging neighboring pixels, for example, to applying a filter kernel, such as a binomial filter, for example. It should be understood that other variations of downsampling can be part of embodiment procedures, including averaging over different numbers of pixels and even averaging over different ranges of pixels for different axes of the imaging plane for video images, for example.

Thus, downsampling can include spatially averaging pixels in the video frames to increase signal-to-noise (S/R) ratios and change the spatial scale of motion monitoring. In this way, all motions can become, effectively, sub-pixel motions. This includes motions of a target object captured as representations of motion in a video sequence, as well as apparent motion of a reference object with respect to the imaging plane of a video camera (due to real camera motion with respect to the scene). Thus, as used herein, "sub-pixel" can include either motions that are initially less than one pixel in unprocessed video images, or motions that become effectively sub-pixel motions through downsampling. Either way, the motions are then sub-pixel motions for purposes of filtering to determine motion signals and optical flow. Downsampling for purposes of this type of filtering has been further described in U.S. patent application Ser. No. 15/012,835, filed on Feb. 1, 2016, and entitled "Video-Based Identification of Operational Mode Shapes," which is incorporated herein by reference in its entirety.

It has been demonstrated that constant contours of the local phase through time correspond to the displacement signal, as described by the papers Fleet, D. J. and Jepson, A. D., Computation of component image velocity from local phase information, Int. J. Comput. Vision, Vol. 5, No. 1, pp. 77-104, September 1990; and by Gautama, T. and Van Hulle, M., A phase-based approach to the estimation of the optical flow field using spatial filtering, Neural Networks, IEEE Transactions on, Vol. 13, No. 5, pp. 1127-1136, September 2002; both of which are incorporated by reference herein in their entirety. Using the notation of Equation (1), this can be expressed as $$\phi_\theta(x,y,t) = c \quad (2)$$

for some constant c. Differentiating with respect to time yields $$\left(\frac{\partial \phi_\theta(x,y,t)}{\partial x}, \frac{\partial \phi_\theta(x,y,t)}{\partial y}, \frac{\partial \phi_\theta(x,y,t)}{\partial t}\right) \cdot (u, v, 1) = 0 \quad (3)$$

where u and v are the velocity in the x and y directions, respectively. It is approximately the case that Thus, the velocity, in units of pixels is $$u = -\left(\frac{\partial \phi_0(x, y, t)}{\partial x}\right)^{-1} \frac{\partial \phi_0(x, y, t)}{\partial t} \text{ and} \quad (4)$$

$$v = -\left(\frac{\partial \phi_{\pi/2}(x, y, t)}{\partial y}\right)^{-1} \frac{\partial \phi_{\pi/2}(x, y, t)}{\partial t}$$

The quantities u and v for given pixels (e.g. downsampled pixels), can constitute local optical flow for given pixels, as used herein. Furthermore, local optical flow can include pixel-wise displacement signals in time. The velocity between the ith frame and the first frame for all i can be computed to give a displacement signal in time. The result of the aforementioned processing is a displacement signal at all salient points in the image.

Furthermore, "global optical flow," as used herein, denotes a collection of pixel-wise velocities or displacements, for either raw pixels or downsampled pixels, across either a full scene or a portion of the scene. For example, a global optical flow field can include the velocities or displacements described above, calculated pixel-wise, for a collection of pixels covering an entire image of a scene or a portion of the scene, which portion can be a portion including both target and reference objects, or either the target or reference object alone, or even a portion of either a target or reference object. Portions of a scene selected for calculation of global optical flow can be defined by downselecting pixels on the basis of degree of local contrast, for example. "Downselecting" pixels is further described in U.S. patent application Ser. No. 15/012,835, filed on Feb. 1, 2016, and entitled "video-based identification of operational mode shapes," which is incorporated herein by reference in its entirety. Furthermore, as used herein, it should be understood that measuring a global optical flow field including a target object and a reference object can include defining different, respective regions of a scene and determining separate, respective global optical flow fields for the respective portions of video images. Downselection of pixels, as well as defining particular regions of a series of images for respective global optical flow fields, are described hereinafter in connection with FIGS. 12A, 13B, and 17A, for example.

In some embodiments, in addition to measuring the global optical flow field, a graphical representation of the flow field can be made and presented. Graphical representations of global optical flow fields are illustrated in FIGS. 1A-1D of U.S. patent application Ser. No. 14/279,254, filed on May 15, 2014 and entitled "Methods And Apparatus For Refractive Flow Measurement," the entirety of which is incorporated herein by reference.

After extracting the displacement signals, there may be too many signals for a person to reasonably inspect individually, such in the hundreds or thousands. Furthermore, it may be unnecessary or undesirable to perform automated inspection of this many individual signals for reasons of processing speed or limited computational resources. Thus, in order to get a general sense of the structure in an acquired video sequence, the displacement signals can be averaged, and then a fast Fourier transform (FFT) can used to transform the average displacement signal into the frequency domain to obtain a frequency spectrum of the average displacement signal. In other embodiments, the displacement signals may undergo the FFT first, and then averaged in the frequency domain to obtain an average frequency spectrum for the signals. Examining these two average frequency spectra can provide a good indication of whether or not the measurement shows appreciable signal. Thus, in some embodiments, determining motion of a camera relative to a scene, or calculating a corrected motion of a target object corrected for the camera motion, as based on the optical flow field of the scene, can include analysis in addition to measuring the global optical flow field of the scene. Such analysis can include determining the average motion signals and FFT spectra or other frequency analysis and frequency peaks that are described in further detail hereinafter.

For more in-depth analysis of the displacement signals, standard frequency-domain modal analysis methods such as peak picking or Frequency Domain Decomposition (FDD) can be used, as described in the paper Chen, J. G., Wadhwa, N., Durand, F., Freeman, W. T. and Buyukorturk, O., Developments with Motion Magnification for Structural Modal Identification Through Camera Video, Dynamics of Civil Structures, Volume 2, pp. 49-57, Springer, 2015, the entirety of which is incorporated by reference herein. Peak picking can be computationally fast. However, if the resonant frequency signal is relatively weak, or if it only belongs to part of the structure, it often will not be seen in the average frequency spectrum, and it may not produce any useful results. FDD has the ability to pick out resonant peaks with lower SNR or local resonances. However, FDD may require much more time to run, especially as the signal count grows, because it depends on the calculation of a spectral matrix and a singular value decomposition (SVD). Either peak picking or FDD can result in potential resonant frequencies and operational mode shapes for the structure. Any local vibration modes that are found usually warrant more in-depth processing, with only the signals from that local structure.

Motion compensation of images of a target object (e.g., target structure) for camera motion can accomplished by analyzing displacements from at least two other regions in the video of objects expected to be stationary (reference objects, such as reference structures), separate from the target region or structure of interest. It may be useful to correct displacements (e.g., horizontal displacements) extracted from the structure of interest, for camera translation and rotation motions that contribute to errant signal(s) in the displacement signal from the structure of interest. At least two regions can be used where rotational correction for camera rotation is desired. These two regions can be referred to herein as region 1 and region 2, where region 1 is vertically lower in the video images than region 2. Average displacements, respectively d1 and d2, can be extracted from these two regions. The camera motion translation signal is, thus, the average of these two regions, given below in Equation (5). The camera rotation signal is the difference of these two regions, scaled by a ratio of the height between the region of interest and region 1, and the height difference between region 1 and 2, given in Equation (6). These two signals are subtracted from signals in the region of interest (for the target structure) to correct for camera translation and rotation motions.

$$d_{translation} = \frac{d_1 + d_2}{2} \quad (5)$$

$$d_{rotation}(h) = \frac{h - h_1}{h_2 - h_1}(d_2 - d_1) \quad (6)$$

Description of Various Specific Embodiment Methods and Devices

FIG. 1 is a schematic diagram illustrating a device 100 for measuring motion of a target object using camera images. In FIG. 1, the device 100 is operationally coupled to a camera 102 having a field of view 104 encompassing a scene 106. In other embodiments, the device 100 is not operationally coupled to a camera. Instead, in other embodiments, the device 100 can be configured to receive images from the camera 102 via temporary storage media, such as a thumb drive, a storage card, or other means. In other embodiments, such as that illustrated in FIG. 10, the device 100 and the camera 102 can be operationally coupled via a network environment. In yet other embodiments, the device 100 and camera 102 can be parts of the same apparatus, such as a mobile phone or tablet computer or any other apparatus that includes both image sequence capture and processor functions.

As used herein, "camera" denotes any device that can be used to capture video images of a scene including a target object and a reference object. "Video images" may also be referred to herein as video frames, a video sequence, camera images, an image sequence, an image sequence of a scene, a sequence of video images, and the like.

The scene 106 encompasses both a target object 108 and a reference object 110. The target object can be any object or structure with potential motion to be observed, evaluated, or otherwise measured. Furthermore, as described hereinafter in connection with FIG. 2, the reference object 110 can be in the background, foreground, or other location with respect to the target object and capable of being captured in the same sequence of video images as the target object. Furthermore, in some cases, the target and reference objects 108 and 110 can both form parts of a common structure. The target object 108 can undergo real motion 116 that can arise from a wide variety of different sources, including environmental forces, forces internal to the target object, such as moving parts of a machine target object, natural or artificial forces, resonant or non-resonant response of the target object to forces, etc.

The camera 102 is configured to provide a sequence of images 114 of the scene, and the sequence of images 114 includes representations 108' and 110' of the target object 108 and reference object 110, respectively. The real motion 116 of the target object is captured in the sequence of images as representations 116' of the real motion 116 of the target object.

In addition to actual motion of the target object, the sequence of images 114 can also be affected by real motion 118 of the camera 102. In particular, from the perspective of the camera 102, images will include not only representations of real motion of the target object, but also representations of apparent motion of the target object and reference object with respect to the camera 102. In particular, the captured representations of real and apparent motion are with respect to an image plane 112 of the camera (e.g., the plane of a pixel array). These apparent motions of the target and reference objects can be captured as representations 118' of apparent motion.

The representations 118' of apparent motion can overwhelm representations 108' of real motion of the target object 108 in many cases, particularly when the representations 108' of real motion of the target object are sub-pixel in magnitude. Embodiment methods and devices described herein can be used to overcome this difficulty by removing noise from camera images, in the form of the apparent motions of the target or reference object due to the real motion 118 of the camera, to produce corrected motions of the target object with minimized noise. Representations of real (actual) motion of the target object may differ in magnitude from representations of apparent motion due to the video camera. Thus, downsampling video images, as described hereinabove, can be useful to maintain either representations of real motion or representations of apparent motion within an upper bound of 1-2 pixels, for example, in order to process the images successfully.

A general way to describe motion correction as disclosed herein includes the following. Total motion observed in a video sequence of images can be represented as TOTM. The portion of the total motion that results from actual motion of the target object within the scene (the corrected motion of the target object that is desired to be measured) can be represented as TM. The portion of the total motion observed in the video that arises from camera motion (also referred to herein as motion of the camera relative to the scene, which is observed in the video as apparent motion or apparent sub-pixel motion of the reference object with respect to the imaging plane of the camera) can be represented as CM. With these definitions established, overall correction of images of a target object for camera motion can be represented mathematically as TM=TOTM−CM.

Figure 2:
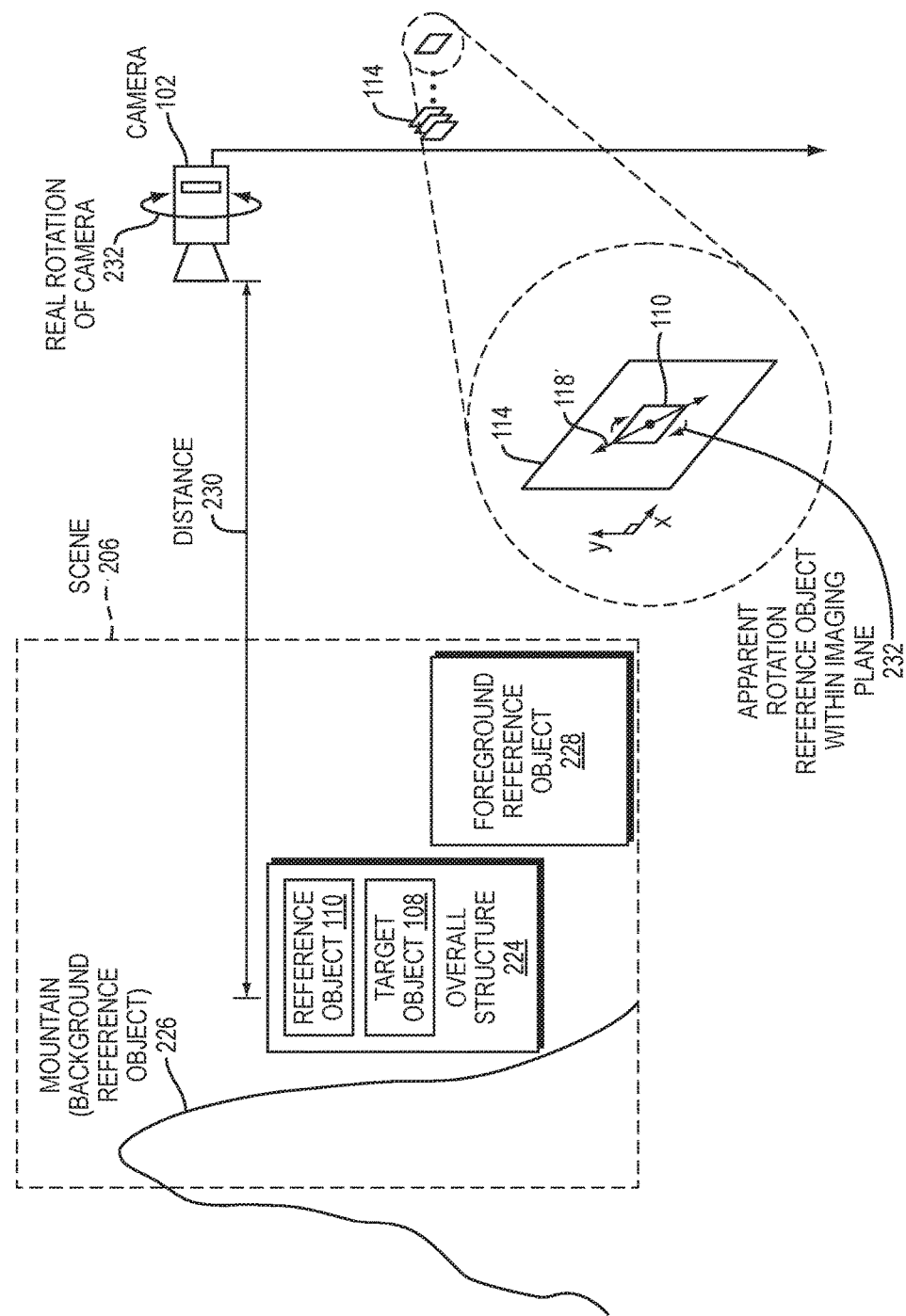
FIG. 2 is a schematic diagram illustrating different types of objects and structures that the reference object shown in FIG. 1 can include different types of objects and structures.

As will be understood, this equation for TM can be written separately for multiple axes in an imaging plane, including, for example, orthogonal X and Y axes, as illustrated in FIG. 2, for example. If desired, separate motions can be extracted from the sequence of images of the corresponding multiple axes, and separate corrected motions can be determined for the axes and either analyzed and displayed separately or combined into two-dimensional vector representations of motion, for example. Thus, as described further herein, determining motion of the camera can include measuring the apparent, sub-pixel motion of the reference object in one or two or more linear axes contained within the imaging plane of the camera. Furthermore, as also described herein in reference to FIG. 2, for example, camera motion CM can include camera rotation, resulting in apparent rotation of the target and reference objects with respect to the imaging plane of the camera. The rotational motion of the camera, as part of CM, can also be subtracted from the total motion TOTM, as described further in a specific example measurement hereinafter.

Accordingly, a feature of embodiments described herein is the ability to determine camera motion CM and to correct motion images and other motion calculations for CM. According to various embodiments and measurement cases, the camera motion CM can be determined by analyzing a portion of video images having representations of motion of a reference object or structure. Such reference object can include a background object, foreground object, or even part of a structure of which the target object forms a part. Furthermore, as an alternative, the camera motion CM may be determined based exclusively, or in part, upon measurements using an external sensor.

The device 100, in particular, is an example device configured to perform these correction functions. The device 100 includes memory 120 configured to store the image sequence 114 of the scene 106 including the target and reference objects captured as representations in the image sequence 114. The device 100 also includes a processor 122 that is configured to measure a global optical flow field of the scene 106 from the image sequence 114 of the scene. The processor 122 is also configured to determine motion, relative to the scene 106, of the camera 102 used to capture the image sequence 114 by measuring the apparent, sub-pixel motion 118' of the reference object 110 with respect to the imaging plane (image plane) 112 the camera 102. The apparent motions 118' are in image space in the sequence of images 114.

The processor 122 is still further configured to calculate a corrected motion 116' of the target object 108, corrected for motion of the camera 102, based on the optical flow field of the scene and on the apparent, sub-pixel motion of the reference object 110 with respect to the imaging plane 112 of the camera. The corrected motion 116" of the target object can take a variety of different forms. For example, the corrected motion 116" can take the form of an averaged displacement signal for the target object over time, as illustrated in FIG. 18A, for example. Furthermore, the corrected motion 116''' can also take other forms, such as the form of a corrected FFT, corrected for camera motion, which can then be used to calculate a 1D mode shape, corrected for camera motion, for example.

FIG. 2 is a schematic diagram illustrating that a reference object, as described in connection with FIG. 1, can include many different types of objects and structures. For example, in a scene 206 in FIG. 2, the reference object 110 and target object 108 are part of an overall structure 224. This situation can occur, for example, where a building, bridge, or other mechanical structure includes portions that have different tendencies to move or be affected by the environment. As understood in the arts of mechanical and civil engineering, for example, different portions of a structure can exhibit different vibration modes. One portion of a structure can constitute the target object 108, while another portion of the same structure can constitute the reference object 110, for example. In one example described further hereinafter, a large antenna on top of a building was analyzed for motion as a target object, while the relatively more rigid building on which the antenna stands was analyzed as a reference object due to the much smaller tendency to exhibit motion relative to the antenna.

In other embodiments, the reference object can be a background reference object, such as the mountain 226 illustrated in FIG. 2. Background reference objects can be any object or structure, natural or human made, such as mountains, trees, buildings, or other structures or features that have less tendency toward motion than the target object 108, at least within a given frequency range of interest. In yet other embodiments, the reference object can be a foreground reference object 228 in the foreground of the target object within the scene 206. In preferred applications of embodiment methods and devices, motion of the reference object is significantly less than motion of the target object. For example, in some embodiments, motion of the reference object is a factor of 10 smaller than motion of the target object. Even more preferably, motion of the reference object is a factor of 100 smaller than that of the target object, and even more preferably, motion of the reference object is a factor of 1,000 or more smaller than the motion of the target object. In this way, the reference object can serve as a more effective, more stationary reference for determining camera motion for which apparent motion of the target object is to be corrected.

In some embodiments, a distance 230 between the reference object and the camera can be greater than or equal to 30 m, for example. Where both the target and reference objects are 30 m or more away from the camera acquiring the camera images, there can be issues with parallax, and correction based on apparent motion of the reference object may not accurately represent proper correction for the target object without further analysis. Nonetheless, measurements according to embodiment methods and devices can still be performed where target object, reference object, or both are less than 30 m away from the camera. In these cases, provided that absolute camera translations are much smaller than the distance between the camera and the closest of the target or reference object, the correction for camera translation can still be sufficiently accurate. In this case, the camera translation (absolute) is smaller than a factor of $\frac{1}{1000}$ of the smaller of the two distances from the camera to the reference or target object. Where the absolute camera translation is greater than this value, but less than $\frac{1}{10}$ of the nearest distance, or less than $\frac{1}{100}$ of the nearest distance, for example, correction for translation of the camera may not be as accurate as preferred. However, correction for rotation of the camera under these conditions can still be reliable.

In addition to camera translational motion, as illustrated by the real motion 118 in FIG. 1, for example, there can also be real rotation 232 of the camera 102, as illustrated in FIG. 2. Such real rotation of the camera can show up as apparent rotation 232' of the reference object within the imaging plane of the camera. As further described herein, embodiment devices and methods can also be used to correct video images for this apparent rotation due to real camera motion, thus further removing sources of noise to distinguish true motion of the target object 108. Thus, this rotational correction is a further advantageous feature of embodiment devices and methods.

The sub-pixel, apparent motion 118' of the reference object as illustrated in FIG. 1 can be analyzed in two or more linear axes of the imaging plane 112 of the camera. For example, X and Y axes of the image 114 are illustrated in FIG. 2, and the apparent motion 118' can have linear components along both of these axes X and Y. Thus, determining motion of the camera can include measuring the apparent, sub-pixel motion of the reference object in one, two, or even more linear axes contained within the imaging plane of the camera. In order to obtain the motion in two axes, for example, the calculation process described in reference to Equations (1)-(5) hereinabove can be repeated with the filters oriented in orthogonal directions for the different sets of calculations corresponding to the two axes. In other embodiments, the video can be rotated by 90° to obtain motion for two orthogonal axes, for example. These modifications and other modifications relating to analysis in two or more directions will be understood by persons of ordinary skill in the art of video processing using optical flow techniques, in view of the disclosure herein.

Figure 3:
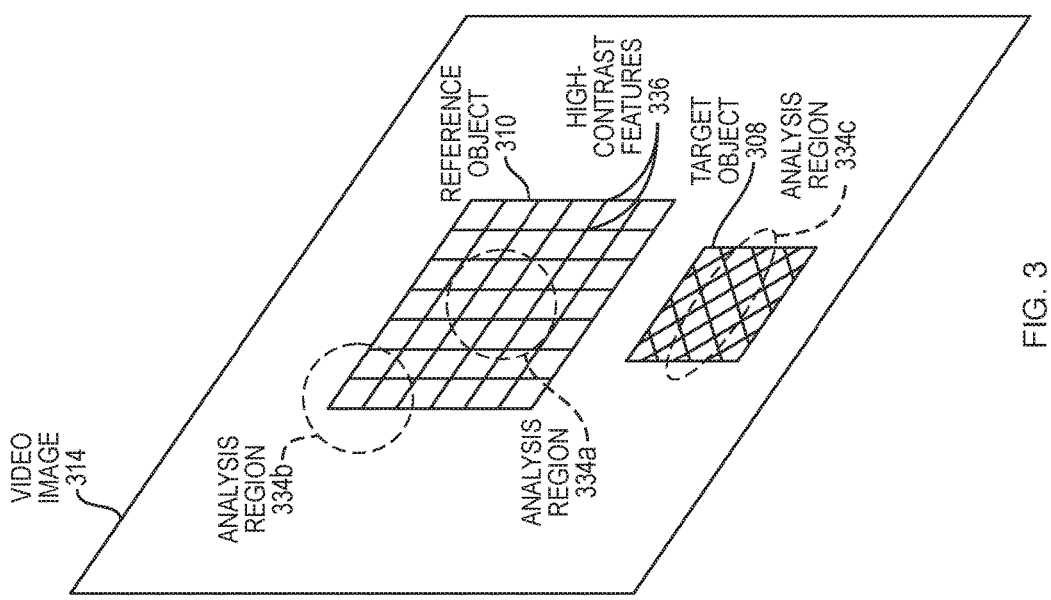
FIG. 3 is a schematic diagram showing an example video image having representations of the target object and reference object in view.

FIG. 3 is a schematic diagram showing an example video image 314 having representations of a target object 308 and a reference object 310 in view. As illustrated in FIG. 3, various analysis regions 334*a-c* can be used to measure on global optical flow field. In particular, high-contrast features 336 in the target object or reference object are useful for performing global optical flow. The analysis region 334*a*, for example, is a region in the center of the reference object 310 having various high-contrast features that can be used to discern motion. Alternatively, the analysis region 334b also includes some edges of the reference object 310, which can also be helpful to obtain high contrast. Similarly, to analyze motion of the target object 308, an example analysis region 334c across the center portion of the target object 308 may be used.

Figure 4A:
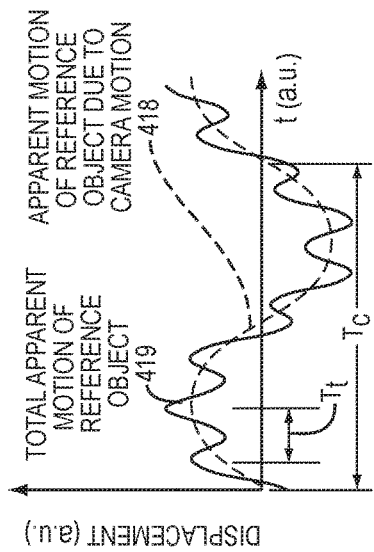
FIGS. 4A-4B are graphs showing example linear displacements that can be measured in video images to obtain target object motion corrected for camera motion.
Figure 4B:
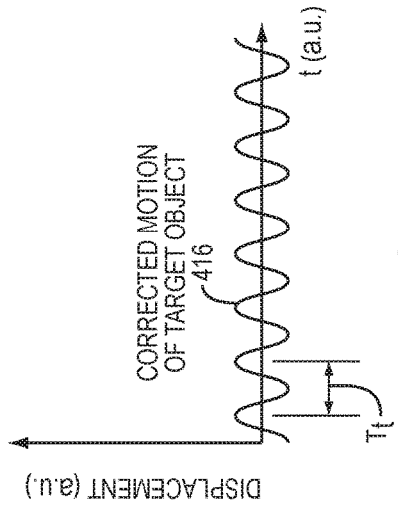

FIGS. 4A-4B are graphs showing example linear displacements that can be measured in video images to obtain target object motion corrected for camera motion. In particular, FIG. 4A shows an apparent motion 418 of a reference object due to camera motion. In this example, the apparent motion 418 is approximately sinusoidal. However, in some cases, camera motion may be an abrupt displacement due to a sudden environmental impact or disturbance, as illustrated in FIGS. 17B-17C, for example.

Furthermore, in other measurement cases, the camera motion may have other patterns, such as non-sinusoidal periodic or non-periodic functions. The apparent motion 418 of the reference object due to camera motion has a period $T_c$ and frequency $F_c=1/T$, in the example of FIG. 4A. Furthermore, a total apparent motion 419 of the reference object, including both the apparent motion 418 and real motion of the target object, is also shown. The total apparent motion 419 of the reference object is also shown as periodic, for example, with a period $T_t$ and frequency $F_t=1/T_t$ that is on the same order of magnitude as the frequency $F_c$ of the apparent motion 418.

In other cases not illustrated in FIG. 4A, the real motion of the target object may be one or more orders of magnitude smaller or larger than the frequency of the camera motion. Where real motion of the target object and apparent motion due to the camera motion are widely separated in frequency, and if apparent motion due to the camera motion is not too large, correction for camera motion may not be necessary in the frequency domain. However, in this scenario, in the time domain, correction would still be necessary. Provided that one or more frequency ranges of the camera motion are known a priori, or can be measured, then a simple frequency filter can be used on the signal to remove the camera motion. However, if the frequencies of the camera motion and real target motion are not well separated (e.g., are on the same order of magnitude), then embodiment devices and methods described herein are particularly helpful to measure and subtract the camera motion. Furthermore, in the example illustrated in FIG. 4A, the displacements due to the camera motion and due to the real motion of the target object are assumed to be oriented along the same axis of the image plane. This is not the case for all measurements, but it is convenient for illustration purposes in FIGS. 4A-4B.

FIG. 4B is a graph showing corrected motion 416 of the target object, having period $T_t$ and frequency $F_t=1/T_t$. In the example of FIGS. 4A-4B, the corrected motion 416 can be obtained by subtraction of the apparent motion 418 of the reference object due to the camera motion from the total apparent motion 419 of the reference object. Obtaining corrected motion signals is further described herein in reference to Equations (5) and (6), as well as the exemplary measurements and corrections described hereinafter.

Figure 5:
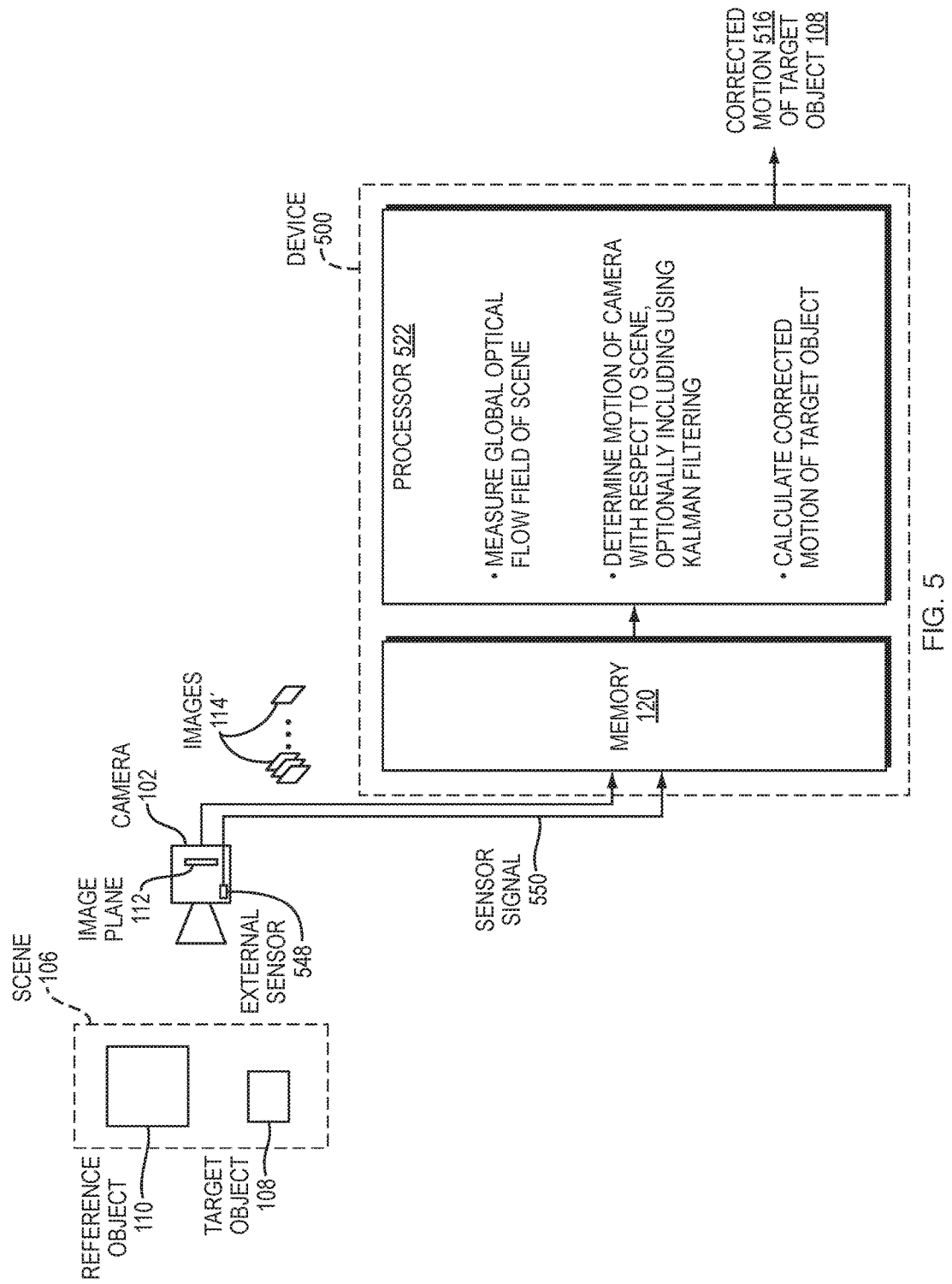
FIG. 5 is a schematic diagram illustrating how an external sensor can be used, optionally, to determine motion of the camera with respect to the scene to correct for camera motion.

FIG. 5 is a schematic diagram illustrating an embodiment device 500 in which an external sensor 548 can be used, optionally, to determine motion of the camera 102 with respect to the scene. The sensor 548 is "external" in the sense that it is a device different from a pixel array alone. The external sensor 548 may be attached to, or incorporated into, the camera 102, for example, as illustrated in FIG. 5. In other embodiments, the external sensor 548 may be attached to the reference object 110, such as a background or foreground reference object. In still other embodiments, an external sensor may be attached to a first portion of the target object 108 and can be used to provide a highly accurate measurement of the motion of the first portion for reference, such that accuracy or precision of determination of motion of a second portion of the target object may be improved. In various embodiments, the external sensor 548 is an accelerometer, gyroscope, magnetometer, inertial measurement unit (IMU), global positioning system (GPS) unit, or velocity meter.

Furthermore, advantageously, in some embodiments, multiple external sensors can be incorporated, and the processor 122 in the device 500 can be configured to use Kalman filtering or another sensor fusion technique such as Bayesian Network to determine a best estimate for motion of the camera with respect to the scene based on the multiple external sensors. The multiple external sensors can be selected from the types listed hereinabove or other types, and may be the same or different from each other.

Use of Kalman filters in relation to measurement of target motions has been described, for example, in Smyth, Andrew and Wu, Meiliang, "Multi-rate Kalman filtering for the data fusion of displacement and acceleration response measurements in dynamic system monitoring," Mechanical Systems and Signal Processing 21 (2007) 706-723, which is incorporated herein by reference in its entirety. While Smyth and Wu describe use of sensors on a structure to determine motion without images, but not the correction of camera images by independent determination of camera motion as described herein, some principles of Smyth and Wu can, nonetheless, be applied in embodiments described herein. In particular, where external sensors are attached to a camera or incorporated into an apparatus having a camera, for example, Kalman filtering as described by Smyth and Wu may be used to determine a best estimate of camera motion.

The external sensor 548 incorporated into the camera 102 provides a sensor signal 550. In the particular embodiment illustrated in FIG. 5, the sensor signal 550 is digitized and is stored in the memory 120 for use by the device 500 in further calculations. However, it will be understood by persons of ordinary skill in the art of sensor measurements that, in other embodiments, a sensor signal can be analog. An analog sensor signal can be digitized by an analog-to-digital converter in the device 500 or another device intermediary between the camera 102 and device 500, for example.

The processor 522 in the device 500 is configured to measure the global optical flow field of the scene including the target and reference objects captured as representations in the image sequence 114' of the scene. In this aspect, the processor 522 has configuration similar to that of the processor 122 described in connection with FIG. 1. In other aspects, however, the processor 522 differs from the processor 122 in determination of motion and calculation of corrected motion of the target object. In particular, as further described in greater detail in connection with FIG. 7, the processor 522 is configured to determine motion, relative to the scene, of the camera used to capture the image sequence by obtaining a sub-pixel motion measurement from the external sensor 548. Where multiple external sensors are used, the processor 522 can optionally implement Kalman filtering or another sensor fusion technique to determine a best estimate of the motion of the camera with respect to the scene based on the multiple external sensor measurements. A corrected motion 516 of the target object 108 can then be calculated based on the optical flow field of the scene and the sub-pixel motion measurement from the external sensor 548.

Figures 6, 7:
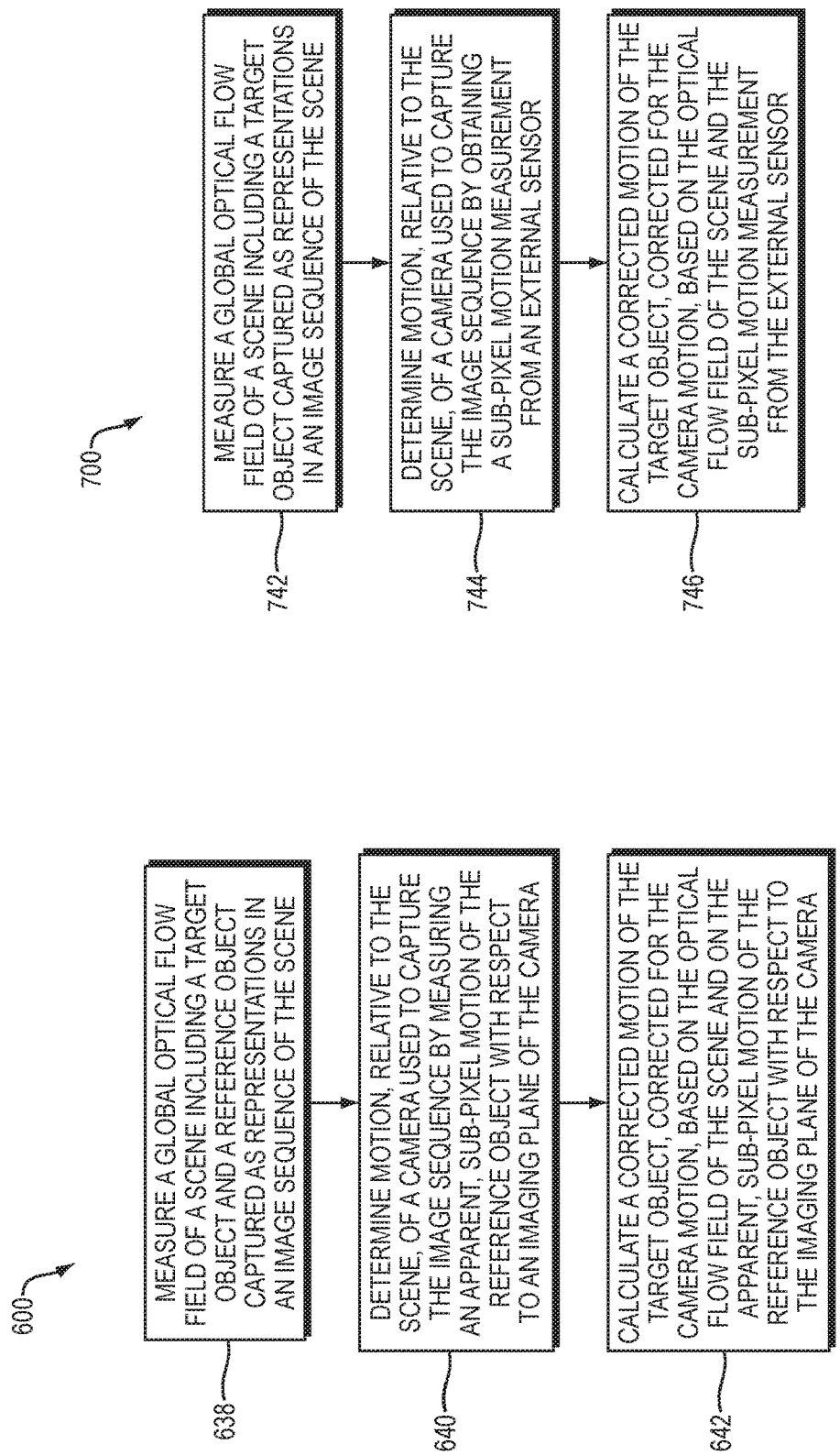
FIG. 6 is a flow diagram illustrating an embodiment procedure for measuring motion of a target object using camera images including a reference object.
FIG. 7 is a flow diagram illustrating an embodiment procedure for measuring motion of a target object using camera images of a target object and an external sensor measurement.

FIG. 6 is a flow diagram illustrating a procedure 600 for measuring motion of a target object using camera images. The procedure 600 illustrates, in further detail, measurements and calculations that can be performed by the processor 122 in FIG. 1, for example. At 638, a global optical flow field of the scene is measured, including a target object and reference object captured as representations in an image sequence of the scene. At 640, motion of the camera used to capture the image sequence is determined, relative to the scene, by measuring an apparent sub-pixel motion of the reference object with respect to an imaging plane of the camera. At 642, a corrected motion of the target object is calculated, corrected for the camera motion, based on the optical flow field of the scene and on the apparent sub-pixel motion of the reference object with respect to the imaging plane of the camera.

FIG. 7 is a flow diagram illustrating a procedure for 700 for measuring motion of a target object using camera images. The procedure 700 differs from the procedure 600, in that the procedure 700 can be used where external sensor measurements are incorporated. In the case of procedure 700, which can be performed by the processor 522 illustrated in FIG. 5, for example, use of measurements of the reference object 110 is optional, as only the target object 108 need be viewed by the camera 102. In some embodiments, correction of the target object motion signal is performed on the basis of reference object signals alone or the external sensor measurements alone. However, as will be further understood in view of this disclosure, a combination of reference object motion signals and external sensor measurements can be used in other embodiments. For example, an average or weighted combination of the two correction signals may be used for correction of the target object motion signals. Alternatively, either one of the reference object motion signals or the external sensor measurements may be used simply as a reliability check for the other.

In FIG. 7, at 742, a global optical flow field of a scene including a target object is measured. The target object is captured as representations in an image sequence of the scene. At 744, motion of the camera used to capture the image sequence is determined, relative to the scene, by attaining a sub-pixel motion measurement from the external sensor. At 746, a corrected motion of the target object, corrected for the camera motion, is calculated based on the optical flow field of the scene and the sub-pixel motion measurement from the external sensor.

Figure 8:
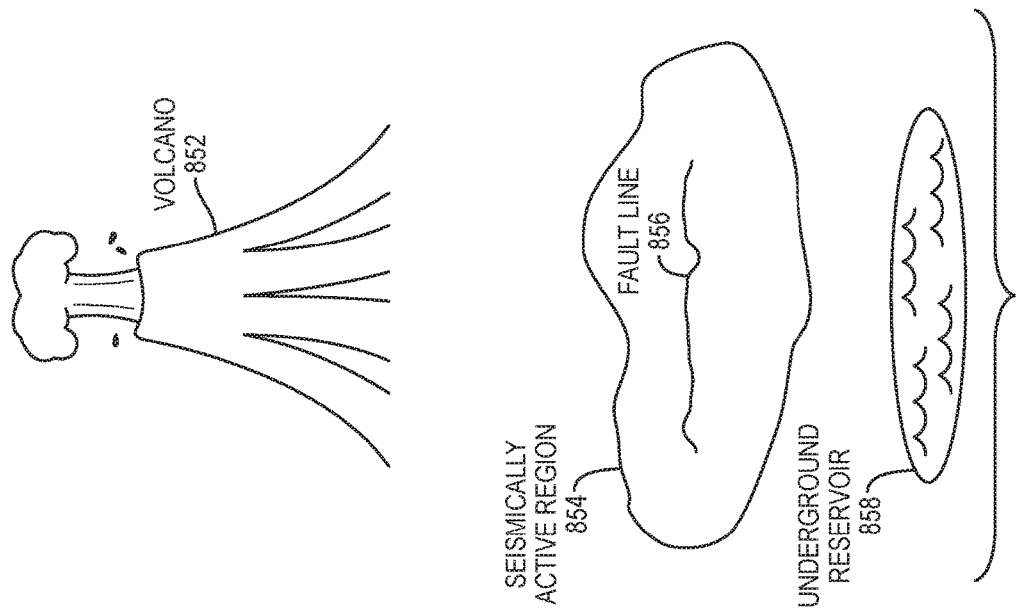
FIG. 8 illustrates various natural geologic features that can be monitored using embodiment devices and methods.

FIG. 8 illustrates various natural geologic features that can be monitored using embodiment devices and methods. In particular, the camera 102 illustrated in FIG. 1 can be configured to monitor various natural target objects in order to determine sub-pixel motion of the target objects, including a volcano 852, a seismically active geologic region 854, optionally including a fault line 856, and an underground reservoir 858. The underground reservoir can be a petroleum reservoir or water reservoir, for example. When used to monitor these example regions as targets, embodiment methods and devices can be used for early detection of volcano instability by monitoring geological features of the volcano, earthquake monitoring, condition of a reservoir, or seismic oil exploration, for example.

Embodiment methods and devices can also be used for monitoring motions of soil near a building foundation, in an open quarry or mine or above an underground quarry or mine, for example. Monitoring according to embodiment methods and devices can be useful for checking volcanoes for movement or disturbance that could indicate instability or an upcoming eruption, for example. In this case, the volcano or a portion thereof would be considered the target object, while various reference objects could include other terrain not part of the volcano, a mountain in a background or adjacent to the volcano, or a horizon, for example. A seismically active geologic region can include a hydraulic fracturing environment. In this application, a camera distant or otherwise sufficiently spaced from the fracturing environment can be configured to monitor an area of ground above the underground fracturing as a target, comparing with a mountain, hill, or other geologic feature or human made feature as a reference object, for example. Similarly, where underground reservoirs such as petroleum or water reserves are tapped or drilled, ground above the reservoir can shift or otherwise become unstable. Thus, ground above the underground reservoir can be monitored as a target object, while other natural or geologic or human made objects can be used as a reference. In some applications, measuring a fault line as a target object can include monitoring a geologic region surrounding the fault line, for example, with other geologic features used for reference. In yet other applications, monitoring a fault line can include monitoring an actual fracture in the earth, with different sides of the fracture monitored as target and reference, respectively. Thus, in some uses, relative motion between parts of a monitored object or other target feature can provide the necessary information.

Figure 9:
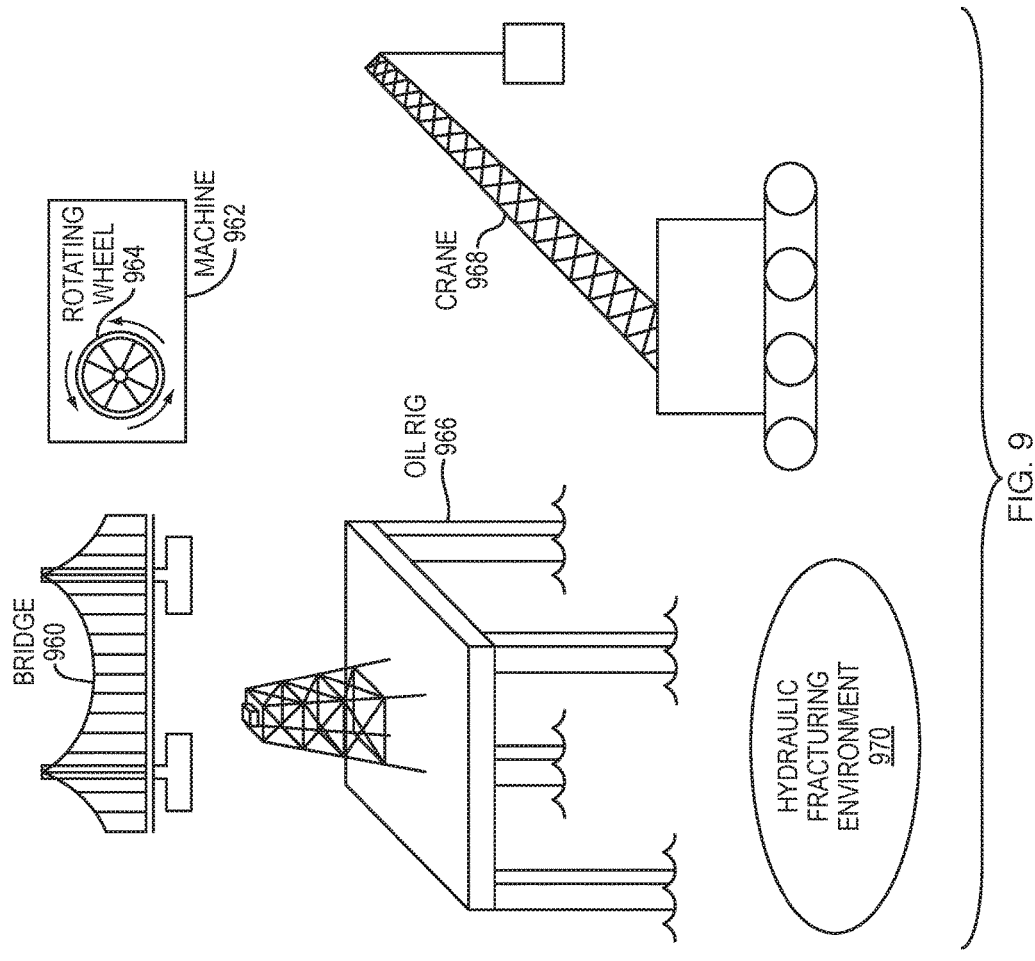
FIG. 9 illustrates various alternative, human made structures and environments that can be targets having motion measured according to embodiments.

FIG. 9 illustrates various alternative, human made structures and environments that can be targets monitored by the camera 102. Some structures include a bridge 960, a machine 962 with motion caused by moving parts such as a rotating wheel 964, and a crane 968. In addition, an oil rig 966 and a hydraulic fracturing environment 978 may be monitored as target objects. Other target objects not shown in FIG. 9 can include skyscrapers or other buildings having a tendency toward, or risk of, motion, for example. In various examples such as those shown in FIG. 9, embodiment methods and devices can be used to monitor structural integrity, check for resonant vibrations, and the like.

Where a bridge is monitored, a footing of the bridge or a natural or human-made feature adjacent to the bridge can be used as a reference object, for example. Monitoring a crane can be helpful to check for instability or unusual motion that can lead to a failure or collapse, for example. The oil rig described above can be an offshore oil rig structure, for example. As understood in the industry of oil drilling, objects on an oil rig, such as flare towers or other structures, can exhibit motion or instability due to waves incident on the oil rig. Thus, the oil rig as a whole, or specific towers or structures on the oil rig, can be measured as target objects, while a horizon, for example, can be monitored as a reference object.

In each of the examples illustrated in FIG. 8 and FIG. 9, analysis of a reference object may be used to determine camera motion, or an external sensor may be employed to determine camera motion to improve accuracy of measured target motion. Where a reference object is used, such object can include a background or foreground object, such as a building or other stable structure, or a natural reference object such as a mountain.

Figure 10:
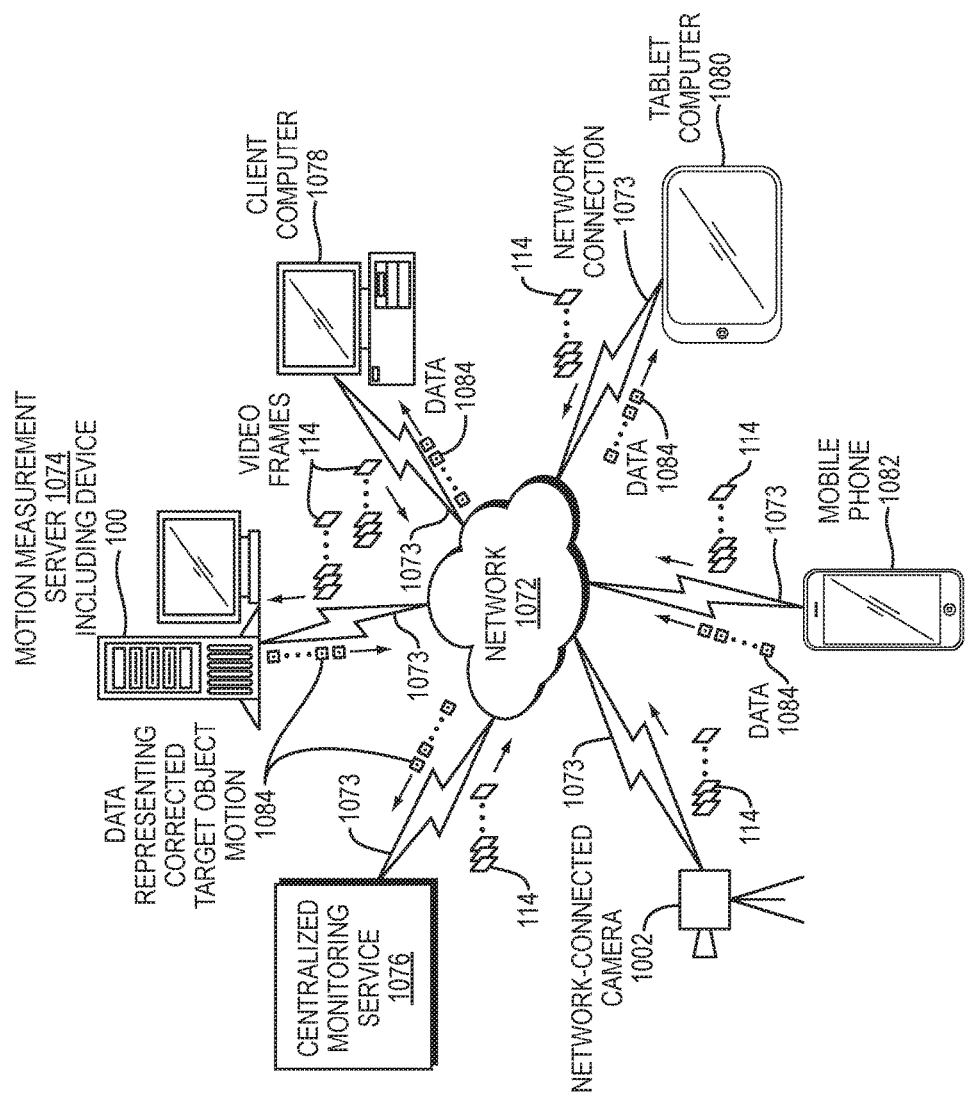
FIG. 10 is a schematic diagram of a network environment in which embodiment methods and devices can operate.

FIG. 10 is a schematic diagram of a network environment 1072 in which various embodiment devices and methods can operate. A motion measurement server 1074 can include the devices 100 illustrated in FIG. 1. Thus, the server 1074 can correct target motion for any camera motion that may occur by using the procedures illustrated in FIGS. 6-7, for example. The server 1074 can be in communication with various devices and locations via the network 1072, which includes network connections 1073. The network connections 1073 can include, for example, Wi-Fi signals, Ethernet connections, radio or cell phone signals, serial connections, or any other wired or wireless form of communication between devices or between a device and the network connections 1073 that support the communications.

The server 1074 can receive video frames (sequence of images) 114 from various network connected devices, including a client computer 1078, a tablet computer 1080, a mobile phone 1082, and a network-connected camera 1002, which can be similar to the camera 102 illustrated in FIG. 1 and also include a network interface. Furthermore, while not illustrated in FIG. 10, the camera 1002 or mobile phone 1082 can include an attached external sensor. External sensor measurements, like the camera images, can be sent to computers for processing via the network 1072. Devices such as the mobile phone 1082 can include a camera configured to acquire the frames of the video stream 114 of the target object being monitored for motion. However, in other embodiments, devices such as the client computer 1078 can receive video frames 114 from other sources, such as the network camera 1002 or any other source of video frames showing a target object to be monitored for motion. Video frames 114 can be sent through the network 1072 to the motion measurement server 1074. Accordingly, measuring, determining, and calculating as described herein can occur at the motion measurement network server and operate on image sequences received via various network paths from a variety of devices.

The motion measurement server 1074 can report back through the network 1072 to the devices 1078, 1080, and 1082. The reporting can include data 1084 representing corrected target object motion. The data 1084 can be in various forms, such as displacements of the target object over time, motion-magnified video images of the target object, a frequency spectrum of the target object motion, etc. Some of the forms that the data 1084 can take are described further in connection with FIG. 1, which describes a corrected motion 116''' of the target object 108. Accordingly, embodiment methods and corresponding devices can encompass uploading an image sequence to a remote server or downloading a representation of the corrected motion of the target object from the remote server Also connected to the network 1072 is a centralized monitoring service 1076. The centralized monitoring service 1076 can include government, military, civil engineering, or other industrial-use center that can store video frames 114 received by the network 1072 from various devices and locations, for example. Where necessary, the centralized monitoring service 1076 can also upload video frames 114 captured using the various network devices, or received from other sources not illustrated in FIG. 10, to the motion measurement server 1074 via the network 1072. The centralized monitoring service 1076 can then receive data 1084 representing corrected target object motion, images 114, or any other data provided by the various networked devices or the server 1074.

In one embodiment, the centralized monitoring service 1076 is a civil engineering firm providing structural or vibrational analysis services using the corrected motions of the target object by subscription, for example. As will be understood by those skilled in the art of data networks, the motion measurement server 1074 can be located at the centralized monitoring service 1076. Furthermore, other motion measurement servers 1074 can be located at other network locations.

In another embodiment, anyone of the network devices such as the client computer 1078, tablet computer 1080, or mobile phone 1082 can be configured to include the memory 120 and processor 122 illustrated in FIG. 1, or the processor 522 illustrated in FIG. 5, to perform the specialized data processing functions of the motion measurement server 1074. Accordingly, the camera can be part of any one of a variety of mobile devices. The measuring, determining, and calculating functions described in connection with the server 1074 or processor 122, for example, can occur in the mobile device.

Description of Exemplary Measurements

FIGS. 11A-18C illustrate various aspects of an example measurement of a corrected motion of a target object including optional verification measurements and calculations designed to provide additional proof of concept. In particular, the target object was an antenna tower situated atop the Green Building on the campus of Massachusetts Institute of Technology (MIT), a 21 story, 90 m tall reinforced concrete building. A camera was located on a terrace of the Stata Center, another building at MIT, a distance of approximately 175 m away from the Green Building. The Green Building itself was used as a reference object and could be characterized as a foreground reference object or a reference object part of an overall structure including both the reference and target objects, as described further in connection with FIG. 2. As further described hereinafter, an additional reference object, namely Building 56 on the MIT campus, was also used as an additional reference object. In the example described in connection with FIGS. 11A-18C, an average of the signals from Building 56 and the Stata Center provided increased accuracy for translational measurements of camera motion. This average was also useful as a second reference point for rotational correction for rotational motion of the camera as well. As an alternative, two regions of the Green Building could also have been used for rotational correction. However, because there existed the possibility of some motion of the green building itself, a separate reference point was preferable, not connected with the green building.

FIGS. 11A-11C are illustrations and photographs showing the overall layout of the experiment. FIG. 11A is an aerial view of the campus showing the Stata Center 1186 (the measurement location) situated about 175 m away from the Green Building 1188 (the reference object).

FIG. 11B is a photograph of the camera measurement location, the terrace on top of the Stata Center 1186. On the terrace was placed a camera 1102 configured to acquire a video sequence of images. The camera 1102 was a Point Grey Research Grasshopper® 3 camera with a 24-85 mm zoom lens set to 30 mm so as to capture as much of the Green Building 1188 as possible, as well as the antenna tower 1190 on top of the Green Building, which are also visible in the background of the photograph in FIG. 11B. Also visible in the photograph in FIG. 11B is Building 56, 1105, on the MIT campus, images of which were used as a second reference object as further described hereinafter.

FIG. 11C is an example image from a sequence of images of the antenna tower 1190, Green Building 1188, and Building 56, 1105, used for the example measurements. The resolution of the video images, an example image being the photograph in FIG. 11C, was 1200×1920. This video resolution resulted in a scale factor of 3.65 cm per pixel at the depth of the Green Building structure, as determined based on the 36 m width of the Green Building structure. A 454 second long video, taken at a frame rate of 10 frames per second (FPS), was captured for the experiment. During the measurement itself, the weather was relatively clear and calm, with a cloudless sky.

The measured video of the Green Building 1188 was processed initially to determine whether any frequency peaks indicative of a possible resonance of the building or other structures were captured in the video measurement. Downsampling in the video was also used, as further described hereinabove. In particular, the video was downsampled by a factor of two in each dimension to a size of 960×600. Out of a possible 563,584 pixels, slightly lower than the total number due to the size of the filter kernel with valid convolution results, 1191 pixels with displacements were extracted. The extracted, 1191 pixels with displacements are shown in FIG. 12A.

FIG. 12A is a photograph of the Green Building 1188 and antenna tower 1190 similar to the photograph in FIG. 11C. However, in FIG. 12A, there is a pixel mask overlay over the video screenshot. The extracted, 1191 pixels with displacements are shown in white, while the remaining pixels are shown darkened. The extracted, 1191 pixels with significant displacements can be referred to herein as downselected pixels, and the process of determining and selecting these pixels can be described herein as "downselecting," for example.

Of the 454 second video data collection, the first 150 seconds is without much camera motion, so the signals were cropped to the first 150 seconds for initial analysis. A fast Fourier transform (FFT) was used to obtain a frequency spectrum of the 150 second section of video used for analysis.

FIG. 12B shows an average FFT frequency spectrum, for the 150 second video segment, for the relevant, 1191 pixels that were not masked in FIG. 12A. The most prominent resonant peak in the frequency spectrum of FIG. 12B was a peak 1292 at 2.413 Hz. It was determined that the pixels in the video that contributed to the peak 1292 corresponded to the antenna tower 1190 on top of the Green Building. In the case of FIG. 12B, a displacement signal was calculated for each of the unmasked pixels illustrated in FIG. 12A, and FFT was individually determined for each of the displacement signals. The individual FFT spectra were averaged to produce the average FFT spectrum illustrated in FIG. 12B. In contrast, as described in connection with FIG. 15A hereinafter, the displacement signals for individual pixels can be averaged, followed by calculation of an FFT spectrum for the averaged displacement signal.

FIG. 13A is an image from a cropped portion of the video containing only the tower 1190. This cropped portion of the video was used in order to analyze the motion of the antenna tower 1190 more effectively. While the original video illustrated in FIG. 11C was downsampled to have a size of 960×600, the cropped portion of the video containing the tower, as illustrated in FIG. 13C, had a resolution of 64×240. Furthermore, before processing, the video illustrated in FIG. 13A was downsampled by a factor of two in each dimension to a size of 32×120. Further, with the filter kernel size, a possible 2688 pixels were found to have possible displacements. Out of those 2688 pixels, 441 were found to be high-contrast pixels and were used to extract displacements.

FIG. 13B shows the 441 high-contrast, downselected pixels in white, with the remaining pixels darkened. Selection of pixels on the basis of contrast has been described further in U.S. patent application Ser. No. 15/012,835, filed on Feb. 1, 2016, and entitled "Video-Based Identification Of Operational Mode Shapes," which is incorporated herein by reference in its entirety. Local contrast refers to the amount of visual texture or variedness of pixel values in the local region around the pixel in a video frame. Motion signals can be much better defined in locations of a video frame with sufficient local contrast. Thus, there can be significant advantages of determining the motion of the target object using only pixels with a certain threshold of local contrast, while ignoring relatively textureless or homogenous regions in the video. Thus, as used herein, "downselecting" can denote limiting a number of pixel-wise Eulerian motion signals for increasing processing speed on the basis of local contrast, for example. One way to limit the number of pixel-wise Eulerian motion signals is to select only pixels (or signals corresponding to such pixels) that have at least a given threshold of local contrast. For example, only pixels corresponding to areas of the video frame having contrast in the top 75%, 50%, or 25% of contrasts observed in the image may be selected for further analysis and constitute the downselected pixels, for example. Furthermore, a criterion can include the selecting only pixels having contrast at least 3 dB or 6 dB above an average contrast observed in the video frame, for example.

Figure 14B:
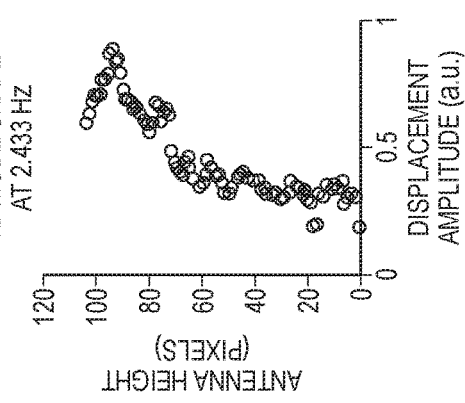
FIG. 14B is a graph showing the first 150 seconds of the displacement signal illustrated in FIG. 14A.
Figure 14A:
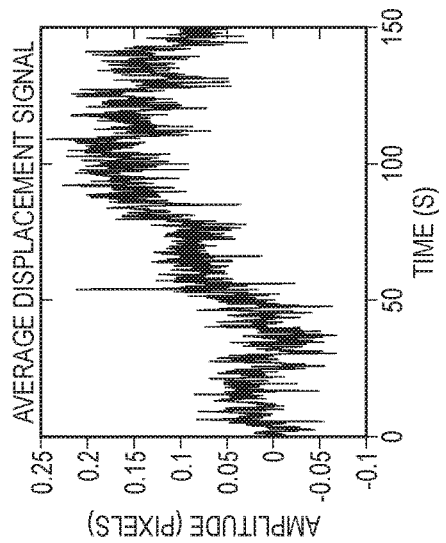
FIG. 14A is a graph showing average displacement of the high-contrast pixels shown in FIG. 13B for the entire 454 second video.

FIG. 14A is a graph showing average displacement of the 441 high-contrast pixels shown in FIG. 13B for the entire 454 second video. Around 170 seconds, a large motion 1494 is visible in the average displacement signal in FIG. 14A due to camera motion.

FIG. 14B is a graph showing the first 150 seconds of the displacement signal illustrated in FIG. 14A. This first, 150 second segment of the video was used for further FFT analysis due to the camera motion, as described hereinabove.

Figure 15B:
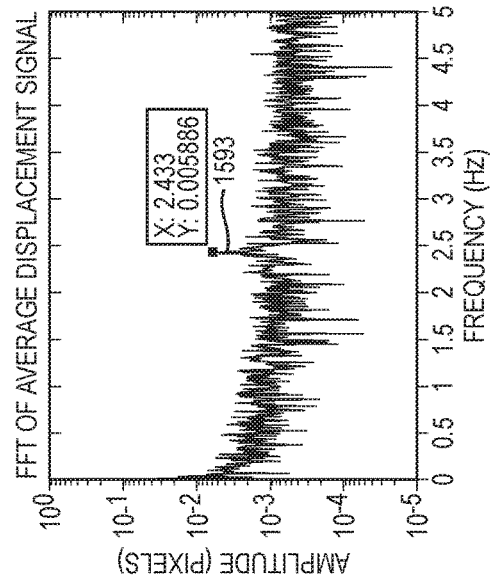
FIG. 15B is a graph showing a one-dimensional (1D) mode shape of the antenna tower target object determined for the peak frequency 2.433 Hz observed in the FIG. 15A graph.
Figure 15A:
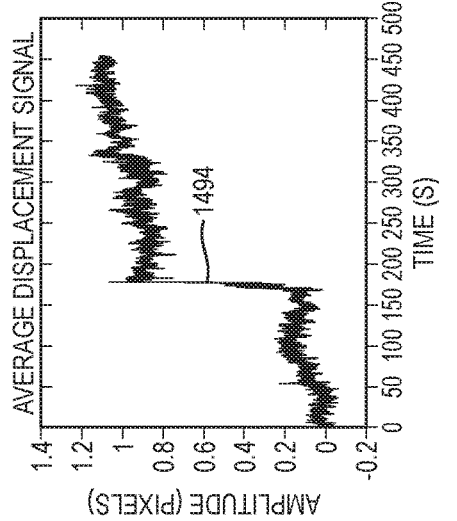
FIG. 15A is a graph showing an FFT of the average displacement signal of the first 150 second segment of the video illustrated in FIG. 14B.

FIG. 15A is a graph showing an FFT of the average displacement signal of the first 150 second segment of video illustrated in FIG. 14B. In particular, the FFT illustrated in FIG. 15A was calculated based on an averaged displacement signal. Thus, displacement signals for individual, local pixel locations were calculated and then averaged to produce an average displacement signal, and the FFT illustrated in FIG. 15A was calculated based on the averaged displacement signal. The FFT shown in FIG. 15A displays a resonant peak 1693 at 2.433 Hz.

FIG. 15B is a graph showing one-dimensional (1D) mode shape of the antenna tower 1190 at the frequency 2.433 Hz seen at 1292 in FIG. 15A. In particular, a peak picking mobile analysis method was used to determine the operational deflection shape of the antenna structure at that frequency. The 1D representation shown in FIG. 15B was generated by averaging, for each given height along the antenna tower, the amplitude of pixels, that vertical height. The resulting shape shown in FIG. 15B is similar to the mode shape for a coherent first bending mode shape of a cantilever beam. The amplitude of the peak displacement in FIG. 15B is 0.00589 pixels, much smaller than previous work has been able to detect. This noise floor is derived from the pixel noise floor of about $2\times10^{-3}$ in FIG. 15B, multiplied by the 3.65 cm per pixel factor to get 0.007 cm (0.07 mm). Thus, using embodiments described herein, it is possible to discern displacements of target objects far below one pixel in size. For example, displacements within a range of about 0.03 pixels and 0.3 pixels can be discerned, and ranges between 0.003 and 0.03 pixels can also be discerned. Furthermore, it is possible, using embodiments described herein and using a video camera with much smaller noise, to detect amplitudes of motion even smaller than the example 0.00589 amplitude and smaller than the example 0.003 pixel amplitude. Using the scaling factor of 3.65 cm per pixel, the amplitude of the resonant peak is calculated to be about 0.215 mm. Given the noise floor of 0.07 mm, the signal to noise ratio (SNR) of this measurement is about 3.

FIG. 16A is a photograph showing a laser vibrometer measurement setup used to verify frequency response of the antenna tower. In particular, a laser vibrometer 1607 was used at close range to the intended tower to measure the frequency response of the antenna tower during a day with weather conditions similar to those that occurred when the measurements illustrated in FIGS. 11A-15B were performed. The laser vibrometer measurements were used to determine the accuracy of the resonant frequency that was measured by the video camera 1102. The laser vibrometer 1607 was placed in a location on the roof of the Green Building about 1 meter (m) away from the base of the antenna tower 1190, measuring a point about 1 m high on the antenna. In order to discount any potential resonances of the laser vibrometer and tripod system itself, a measurement was also made of the ground next to the antenna tower as a reference.

FIG. 16B is a graph showing laser vibrometer measurements obtained using the measurement setup illustrated in FIG. 16A. In particular, the laser vibrometer measurement from the antenna tower is shown in blue, at 1696. The reference signal laser vibrometer measurement taken at the base, on the roof of the Green Building, is shown in red at 1698. From these frequency spectra, and resonant peak 1694 is visible in the tower vibrometer spectrum 1696, measured to be at 2.474 Hz. The frequency of the peak 1694 at 2.474 Hz is very similar to the 2.433 Hz peak measured using the camera, as illustrated in FIG. 15A at the peak 1593. The difference between these measurements is only 1.7%, confirming that the camera used for the measurements illustrated in FIGS. 11A-15B was accurately measuring the resonant vibration of the antenna tower.

FIG. 17A is a photograph of the Green Building and antenna tower, also showing regions of interest used to calculate displacement signals and perform motion compensation. As described hereinabove, the full 454 second video acquired using the camera 1102 was not used in the case of the antenna tower measurement because of camera motion that introduced apparent motion into the measurement of the displacement signal. Given that there was no measurable motion response of the Green Building itself, measurements of the Green Building were used as a reference to measure the camera motion from the video and to subtract it from the displacement signal of the antenna tower. FIG. 17A shows a region of interest 1701 for the antenna tower, a region of interest 1703 for the Green Building, and also a region of interest 1707 for Building 56, 1105. The respective regions of interest 1701, 1703, and 1707 can be considered separate regions for calculation of "global optical flow field" as described herein. Extraction of only certain local optical flow values for pixels corresponding to the respective regions of interest for calculation of average displacement signals, as described hereinafter.

FIG. 17B shows averaged displacement signals for the regions of interest illustrated in FIG. 17A. In particular, the averaged displacement signal 1709, shown in blue, corresponds to the region of interest 1701 for the antenna tower. Similarly, the averaged displacement signal 1711, shown in red, corresponds to the region of interest 1703 for the Green Building, while the signal 1713 is the averaged displacement signal for the region of interest 1707 for Building 56 in the foreground of FIG. 17A. Under the assumption that the Green Building and Building 56 are moving much less than the target antenna tower, processing of the relevant displacement signals can be conceptually represented by the following relationships: Green Building displacement=apparent camera translation+apparent rotation signal; Building 56 displacement=apparent camera translation+apparent rotation signal; and antenna tower (target object) displacement=antenna tower motion+apparent camera translation+apparent camera rotation; where the global optical flow field=apparent camera translation+apparent camera rotation, as defined herein. It should be noted that these conceptual, mathematical relationships are not necessarily straight mathematical additions.

FIG. 17C is a graph showing various calculations performed for the purpose of correcting the motion signal of the target antenna tower. For purposes of these calculated signals, the Green Building average displacement 1711 was treated as displacement $d_1$, and the Building 56 average displacement 1713 was treated as average displacement $d_2$, for purposes of translation and rotation calculations as shown in Equations (5) and (6). Average translational motion was, thus, calculated from the average of the Green Building and Building 56 displacement signals. The calculated average translational motion is shown at 1715 in purple in FIG. 17C. Rotational motion 1717 of the camera, shown in green in FIG. 17C, was calculated from the difference of the Green Building and Building 56 average displacements, using Equation (6). The average of the Green Building and Building 56 average displacements 1711 and 1713, respectively, is shown in blue at 1709 in FIG. 17C.

FIG. 18A is a graph showing the motion corrected displacement signal 1819 for the antenna tower in red, resulting from subtraction of both the horizontal translation 1715 and the rotational displacement 1717 calculated using the references. The average displacement signal 1709, calculated from the average of the Green Building and Building 56 signals, is also shown in FIG. 18A in blue for comparison. Much of the camera motion, especially the large jump around 175 seconds into the signal, is removed from the corrected displacement signal 1819.

FIG. 18B is a graph showing the resulting effects in the Fourier domain. In particular, the frequency spectrum 1821 results from an FFT analysis of the average displacement signal 1709 in FIG. 18A. A frequency spectrum 1823, shown in red, results from an FFT performed on the corrected average displacement signal 1819 shown in FIG. 18A. Most of the difference between the FFT calculations 1821 and 1823 appears to be in the frequencies below 0.2 Hz.

FIG. 18C is a graph showing, in greater detail, the difference in frequency spectrum between the spectra 1821 and 1823 in FIG. 18B, particularly for the range between 0 and 0.5 Hz, and more particularly between 0 and 0.2 Hz. The noise floor is reduced by a factor of two. Additional improvements in the noise floor can be gained by sacrificing the field of view of the camera and zooming in on the structure, in order to have a lower physical distance per pixel scaling factor.

Further Details Regarding Correction of Motion of Target Object for Camera Motion in Some Embodiments In order to further describe the use of an external sensor to determine the sub-pixel motion of the camera, and to correct for the sub-pixel motion, a description of the effects of camera motion on the measured noise is helpful. One goal of using an external sensor is to provide a reference for any camera motion so it can be subtracted or otherwise eliminated from the measured signals indicating the target object motion.

Camera Measurement Noise Due to Camera Motion

The total noise (7N) in units of pixels/$\sqrt{Hz}$ can be calculated by adding the camera noise (CN) in units of pixels/$\sqrt{Hz}$ to the contribution from camera motion which can include the camera translational motion (CTM) divided by the pixel size at distance (PSAD) and the distance d times the camera rotational motion (CRM) divided by the pixel size at distance PSAD, using a small angle approximation. This is summarized in Equation (7). Dividing by the PSAD the total noise in units of millimeters can be obtained, measured for an object of interest at a certain distance, as shown in Equation (8).

$$TN_{pixel} = CN + \frac{CTM}{PSAD} + \frac{d*CRM}{PSAD} \quad (7)$$

$$TN_{mm} = CN*PSAD + CTM + d*CRM \quad (8)$$

$$PSAD = \frac{SPS*d}{LFL} \quad (9)$$

The pixel size at distance, in units of millimeters per pixel can be calculated given the pixel size on the sensor for a camera SPS, the focal length of the lens (LFL), and the distance (d) to the object of interest, using the lens equation and solving for the pixel size as in Equation (9).

Using Equations (7)-(9), the measurement noise due to intrinsic camera measurement noise, camera translational motion, and camera rotational motion can be estimated. Intrinsic camera noise can be assumed to be $10^{-4}$ pixels/$\sqrt{Hz}$, translational motion of the camera $10^{-4}$ mm/$\sqrt{Hz}$, and rotational motion of the camera $5*10^{-5}$ radians/$\sqrt{Hz}$. Plots for the total noise floor including camera motion can be generated, assuming a lens focal length of 24 mm and a camera pixel size of 5.86 micrometers, in units of both millimeters/$\sqrt{Hz}$ at the distance of the target object in FIG. 19A, and in pixels/$\sqrt{Hz}$ in FIG. 19B.

Figure 19B:
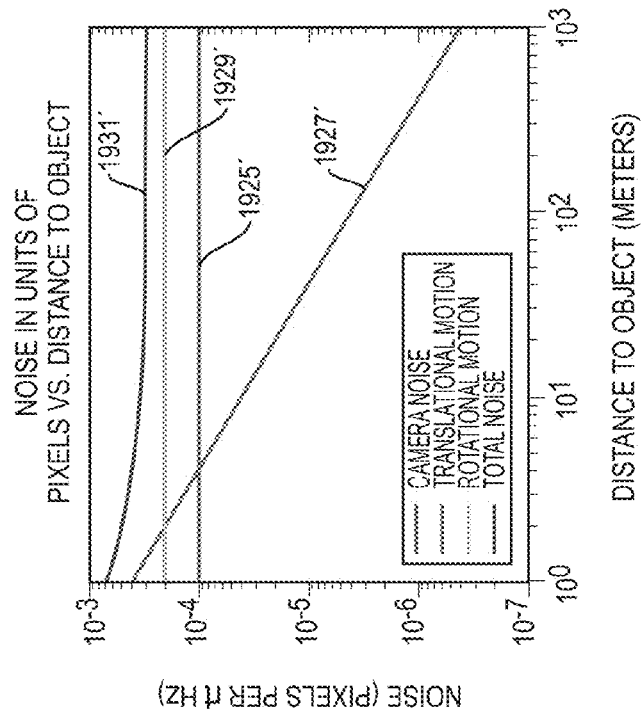
FIG. 19B is a graph similar to FIG. 19A, but showing calculated contributions to total noise, in units of pixels on the imaging plane of the camera acquiring video images of the target object.
Figure 19A:
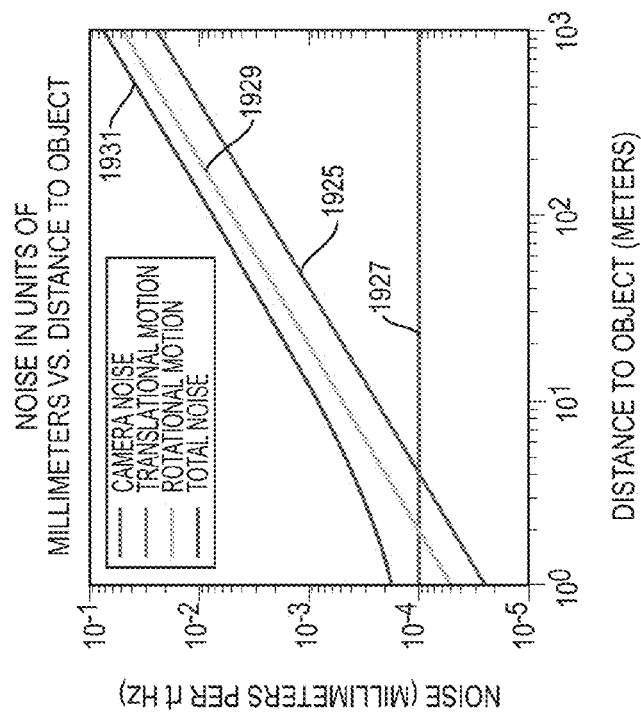
FIG. 19A is a graph showing calculated contributions to total noise using particular camera and target object parameters as described further hereinafter, in units of millimeters at the target object distance as measured in video.

FIGS. 19A-19B are graphs showing hypothetical, calculated contributions to total noise as a function of distance between the camera acquiring video images and the target object. In particular, FIG. 19A shows the calculated contributions, using the assumed values described above, in units of millimeters at the target object distance as measured in video. A calculated line 1925 shows camera noise, a line 1927 shows calculated translational motion, a calculated line 1929 shows rotational motion calculated, and a line 1931 shows total noise calculated.

FIG. 19B shows the calculated contributions to total measurement noise in units of pixels at the imaging plane of the camera. In particular, a line 1925' shows camera noise, a line 1927' shows translational motion noise, a line 1929' shows rotational motion noise, and a line 1931' shows total calculated noise.

External Sensor for Measuring Camera Motion

There are two specific example ways described herein in which an external sensor can be used to measure camera motion. An external sensor can be mounted directly to the camera or it can be somewhere visible in the frame of the camera at a known distance, ideally on the target object. For example, the external sensor can be mounted on the target object antenna tower 1190 illustrated in FIG. 11C, for example, or the target object 108 illustrated in FIG. 2, for example. However, in other embodiments, the external sensor may be used while attached to a reference object, such as the reference object 110, background reference object 226, or foreground reference object 228 illustrated in FIG. 2, or the status center building 1188 or foreground reference building 1105 illustrated in FIGS. 11A-11C, for example.

External Sensor Mounted to the Camera

In the case of an external sensor being mounted to the camera, as illustrated schematically in FIG. 5, for example, the sensor is directly measuring the camera motion and preferably has better sensitivity than the amount of translational motion or rotation motion the camera undergoes and also needs to be able to measure both translational motion and rotational motion. Then the measured camera motion can be as follows in Equation (10) where SMCTM is the sensor-measured camera translational motion, and SMCRM is the sensor-measured camera rotational motion, and distance d to the target object and the previously defined PSAD in Equation (9).

$$\text{Corrected Measurement} = \text{Camera Measurement} - \frac{SMCTM}{PSAD} - \frac{d*SMCRM}{PSAD} \quad (10)$$

External Sensor at Distance in the Video Frame

In the case of an external sensor in the reference video frame (with respect to the imaging plane of the camera), the motion of the camera is indirectly measured. The sensor preferably has better sensitivity than the effect of the camera motion on the measurement at the distance of the sensor ds. However, the sensor only needs to measure translational motion. This can be done as follows, where STS is the sensor translational measurement sensitivity and CTM and CRM are as previously defined.

$$STMS < CTM + ds*CRM \quad (11)$$

To use this external sensor to correct the camera measurement, the measured translation can then be subtracted from the camera measurement.

$$\text{Corrected Measurement} = \text{Camera Measurement} - STMS*\frac{d}{ds} \quad (12)$$

To correct for camera motion that is rotational in the image plane or a roll motion, two external sensors can be used to disambiguate the rotational or roll motion from normal pan or tilt motions.

It should be understood that various aspects of embodiments of the present invention may be implemented in hardware, firmware, and software. If implemented in software, the software may be any suitable language that can cause a processor to execute embodiments or portions of embodiments disclosed herein or otherwise known. The software may be stored on any processor- or device-readable medium, such as RAM or ROM.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of measuring motion of an object using camera images, the method comprising:
   measuring a global optical flow field of a scene including a target object and a reference object captured as representations in an image sequence of the scene;

determining motion, relative to the scene, of a camera used to capture the image sequence by measuring an apparent, sub-pixel motion of the reference object with respect to an imaging plane of the camera, wherein determining the motion of the camera includes measuring the apparent, sub-pixel motion of the reference object within a frequency range of motion on a same order of magnitude as a frequency range of motion of the target object; and calculating a corrected motion of the target object, corrected for the camera motion, based on the optical flow field of the scene and on the apparent, sub-pixel motion of the reference object with respect to the imaging plane of the camera.

2. The method of claim 1, wherein determining the motion of the camera further includes using measurements from an external sensor to calculate the motion, the external sensor including at least one of an accelerometer, gyroscope, magnetometer, inertial measurement unit (IMU), global positioning system (GPS) unit, or velocity meter.

3. The method of claim 2, wherein using measurements from the external sensor includes using the external sensor attached to one of the target object, reference object, and camera.

4. The method of claim 2, further including using a Kalman filter or other sensor fusion technique to obtain a best estimate external sensor measurement used to determine motion of the camera.

5. The method of claim 1, wherein determining motion of the camera includes measuring the apparent, sub-pixel motion of the reference object in one or two linear axes contained within the imaging plane of the camera.

6. The method of claim 1, wherein determining the motion of the camera includes measuring apparent rotation of the reference object within the imaging plane of the camera.

7. The method of claim 1, wherein measuring the global optical flow field of the scene includes using at least a portion of the scene with the reference object being at least one of a foreground object or a background object.

8. The method of claim 1, wherein the target object includes at least one of a seismic structure, a hydraulic fracturing environment structure, a water or oil or gas reservoir, or a volcano, the method further including using the corrected motion of the target object for seismic oil exploration, monitoring a condition of the reservoir, or monitoring geological features of the volcano.

9. The method of claim 1, wherein the target object includes at least one of a bridge, oil rig, crane, or machine.

10. The method of claim 1, wherein measuring the optical flow field of the scene includes using motion magnification.

11. The method of claim 1, wherein measuring the optical flow field of the scene includes extracting pixel-wise Eulerian motion signals of an object in the scene from an undercomplete representation of frames within the image sequence and downselecting pixel-wise Eulerian motion signals to produce a representative set of Eulerian motion signals of the object.

12. The method of claim 11, wherein downselecting the signals includes choosing signals on a basis of local contrast in the frames within the image sequence.

13. The method of claim 1, wherein measuring the optical flow field of the scene includes observing target and reference objects situated at least 30 meters (m) from the camera used to capture the image sequence.

14. The method of claim 1, wherein the measuring, determining, and calculating occur at a network server and operate on the image sequence received via a network path.

15. The method of claim 1, further including uploading the image sequence to a remote server or downloading a representation of the corrected motion of the target object from the remote server.

16. The method of claim 1, wherein the camera is part of a mobile device and wherein the measuring, determining, and calculating occur in the mobile device.

17. The method of claim 16, wherein the mobile device includes an external sensor including at least one of an accelerometer, gyroscope, magnetometer, IMU, global positioning system (GPS) unit, or velocity meter.

18. The method of claim 1, wherein measuring the apparent, sub-pixel motion of the reference object includes measuring sub-pixel motion in a range of 0.03 to 0.3 pixels.

19. The method of claim 1, wherein calculating the corrected motion of the target object includes calculating a corrected motion in a range of 0.03 to 0.3 pixels or in a range of 0.003 to 0.03 pixels.

20. The method of claim 1, wherein measuring the apparent, sub-pixel motion of the reference object includes measuring sub-pixel motion in a range of 0.003 to 0.03 pixels.

21. A device for measuring the motion of an object using camera images, the device comprising:

memory configured to store an image sequence of a scene including a target object and a reference object captured as representations in the image sequence; and a processor configured to:

measure a global optical flow field of the scene from the image sequence of the scene;

determine motion, relative to the scene, of a camera used to capture the image sequence by measuring an apparent, sub-pixel motion of the reference object with respect to an imaging plane of the camera by measuring the apparent, sub-pixel motion of the reference object within a frequency range of motion on a same order of magnitude as a frequency range of motion of the target object; and calculate a corrected motion of the target object, corrected for the camera motion, based on the optical flow field of the scene and on the apparent, sub-pixel motion of the reference object with respect to the imaging plane of the camera.

22. The device of claim 21, wherein the processor is further configured to determine the motion of the camera using measurements from an external sensor to calculate the motion, the external sensor including at least one of an accelerometer, gyroscope, magnetometer, inertial measurement unit (IMU), global positioning system (GPS) unit, or velocity meter.

23. The device of claim 22, wherein the external sensor is attached to one of the target object, reference object, or camera.

24. The device of claim 22, wherein the processor is further configured to implement Kalman filtering or another sensor fusion technique to obtain a best estimate external sensor measurement used to determine the motion of the camera.

25. The device of claim 21, wherein the processor is further configured to determine the motion of the camera by measuring the apparent, sub-pixel motion of the reference object in one or two linear axes contained within the imaging plane of the camera.

26. The device of claim 21, wherein the processor is further configured to determine the motion of the camera by measuring apparent motion of the reference object within the imaging plane of the camera.

27. The device of claim 21, wherein the processor is further configured to measure the global optical flow field of the scene by using at least a portion of the scene with the reference object being at least one of a foreground object or a background object.

28. The device of claim 21, wherein the target object includes at least one of a seismic structure, a hydraulic fracturing environment structure, a water or oil or gas reservoir, or a volcano, and wherein the processor is further configured to use the corrected motion of the target object for seismic oil exploration, monitoring a condition of the reservoir, or monitoring geological features of the volcano.

29. The device of claim 21, wherein the target object includes at least one of a bridge, oil rig, crane, or machine.

30. The device of claim 21, wherein the processor is further configured to measure the optical flow field using motion magnification.

31. The device of claim 21, wherein the processor is further configured to measure the global optical flow field of the scene by extracting pixel-wise Eulerian motion signals of an object in the scene from an undercomplete representation of frames within the image sequence and to downselect pixel-wise Eulerian motion signals to produce a representative set of Eulerian motion signals of the object.

32. The device of claim 31, wherein the processor is further configured to downselect the signals by choosing signals on a basis of local contrast in the frames within the image sequence.

33. The device of claim 21, wherein the image sequence of the scene includes the target and reference objects situated at least 30 meters (m) from the camera used to capture the image sequence.

34. The device of claim 21, wherein the processor is part of a network server, and wherein the processor is configured to operate on, or the memory is configured to receive, the image sequence via a network path.

35. The device of claim 21, wherein the memory is further configured to receive the image sequence from a remote server, or wherein the device further includes a communications interface configured to send a representation of the corrected motion of the target object to a remote server.

36. The device of claim 21, wherein the camera, memory, and processor are part of a mobile device.

37. The device of claim 36, wherein the mobile device includes an external sensor including at least one of an accelerometer, gyroscope, magnetometer, IMU, global positioning system (GPS) unit, or velocity meter.

38. The device of claim 21, wherein the sub-pixel motion of the reference object is in a range of 0.03 to 0.3 pixels.

39. The device of claim 21, wherein the corrected motion of the target object is in a range of 0.03 to 0.3 pixels or in a range of 0.003 to 0.03 pixels.

40. The device of claim 21, wherein the sub-pixel motion of the reference object is in a range of 0.003 to 0.03 pixels.

41. A method of measuring motion of an object using camera images, the method comprising:
measuring a global optical flow field of a scene including a target object captured as representations in an image sequence of the scene;
determining motion, relative to the scene, of a camera used to capture the image sequence by obtaining a motion measurement from an external sensor, the motion measurement being sub-pixel with respect to a pixel array of the camera, wherein determining motion of the camera includes obtaining the sub-pixel motion measurement from the external sensor within a frequency range of motion on a same order of magnitude as a frequency range of motion of the target object; and
calculating a corrected motion of the target object, corrected for the camera motion, based on the optical flow field of the scene and the sub-pixel motion measurement from the external sensor.

42. The method of claim 41, wherein determining motion of the camera further includes measuring an apparent, sub-pixel motion of the reference object with respect to an imaging plane of the camera.

43. The method of claim 41, wherein determining motion of the camera includes obtaining the sub-pixel motion measurement from the external sensor in a range of 0.03 to 0.3 pixels.

44. The method of claim 41, wherein determining motion of the camera includes obtaining the sub-pixel motion measurement from the external sensor in a range of 0.003 to 0.03 pixels.

* * * * *